United States Patent
Miyanishi et al.

(10) Patent No.: US 7,307,923 B2
(45) Date of Patent: Dec. 11, 2007

(54) ELECTRO MAGNETIC FIELD GENERATING ELEMENT, INFORMATION RECORDING AND REPRODUCING HEAD AND INFORMATION RECORDING AND REPRODUCING DEVICE

(75) Inventors: Shintaro Miyanishi, Ikoma-gun (JP); Hiroshi Fuji, Soraku-gun (JP); Kunio Kojima, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 704 days.

(21) Appl. No.: 10/811,429

(22) Filed: Mar. 25, 2004

(65) Prior Publication Data

US 2004/0194119 A1   Sep. 30, 2004

(30) Foreign Application Priority Data

Mar. 28, 2003   (JP)   ............... 2003-092383

(51) Int. Cl.
*G11B 11/00* (2006.01)
*G11B 7/08* (2006.01)
*G11B 7/00* (2006.01)

(52) U.S. Cl. ............... 369/13.02; 369/13.33; 369/121; 720/659; 372/43.01

(58) Field of Classification Search ............. 369/13.01, 369/13.02, 13.33, 116, 121, 122, 112.01, 369/44.11, 44.27, 13.13, 43.01; 720/658, 720/659; 372/49, 45

See application file for complete search history.

(56) References Cited

U.S. PATENT DOCUMENTS 6,687,195 B2   2/2004  Miyanishi et al.
6,956,808 B2   10/2005 Miyanishi et al.
2002/0003752 A1   1/2002  Fuji et al.
2004/0257965 A1*  12/2004 Miyanishi et al. .......... 369/121
2006/0075417 A1*  4/2006  Miyanishi et al. .......... 720/658

FOREIGN PATENT DOCUMENTS

JP   2001-319365   11/2001

OTHER PUBLICATIONS

Onari, S., *Spectroscopy of Solids*, Shokodo Publishing Co., Ltd, 1st ed., Sep. 20, 1994, p. 33.
Otsu, M. and Kawada, S. (ed): *Near-Field Nano-photonics Handbook*, Optronics Co., Ltd., 1st ed. Sep. 5, 1997, pp. 178-179.
Koyama, F. et al.: "Surface emitting lasers for near-field optics", *Oyo Butsuri*, Japan Society of Applied Physics (JSAP), vol. 68, No. 12, pp. 1380-1383.

* cited by examiner

*Primary Examiner*—Ali Neyzari
(74) *Attorney, Agent, or Firm*—David G. Conlin; David A. Tucker; Edwards Angell Palmer & Dodge LLP

(57) ABSTRACT

To realize an electromagnetic field generating element, an information recording and reproducing head and an information recording and reproducing device for high frequency magnetic recording and reproducing by the optically assisted magnetic recording and reproduction using near field, which permit attenuation or delay of a magnetic field to be suppressed, the electromagnetic field generating element of the present invention generates a magnetic field in a direction parallel to the surface of a constricting section by supplying current in the conductive member, and applying a laser beam from the side of the substrate to the constricting section, and a surface plasmon is excited by an magnetic field vector vertical to the surface of the constricting section, thereby generating near field from the surface facing the interface between the substrate and the constricting section.

19 Claims, 19 Drawing Sheets

ELECTRO MAGNETIC FIELD GENERATING ELEMENT, INFORMATION RECORDING AND REPRODUCING HEAD AND INFORMATION RECORDING AND REPRODUCING DEVICE

This Non-provisional application claims priority under 35 U.S.C. § 119(a) on Patent Applications No. 2003-092383 filed in Japan on Mar. 28, 2003, the entire contents of which are hereby incorporated by reference.

FIELD OF THE INVENTION

The present invention relates to a magnetic field generating element for generating magnetic field and near field, an information recording and reproducing head and an information recording and reproducing device.

BACKGROUND OF THE INVENTION

In recent years, the optically assisted magnetic recording has been viewed with interest as a promising technique for next generation high intensity magnetic recording. In this optically assisted magnetic recording, a magnetic recording is performed with respect to a magnetic recording medium, which has high coercive force and high resistance against thermal fluctuations. Specifically, a light beam is focused on the surface of the magnetic recording medium to locally raise the temperature of the magnetic recording medium. At the heated portion of the magnetic recording medium, the coercive force is reduced, and thus a magnetic recording can be performed using a generally used magnetic head. To realize a still higher density magnetic recording, it is necessary to reduce the size of a focused light spot. In response, the technique of using near field, which permits a smaller focused light spot than a diffraction limit of light has been proposed. For example, Japanese unexamined patent application 2001-319365 (Tokukai 2001-319365; published on Nov. 16, 2001) discloses a technique that permits an optically assisted magnetic recording to be realized using the near field by providing a magnetic gap at a yoke extended section from a thin film transducer.

According to the foregoing conventional magnetic recording and reproducing using a magnetic gap at the yoke extended section from the thin film magnetic transducer, a problem of attenuation or delay of the magnetic field at the yoke extended section occurs, which hinders its application to a high frequency magnetic recording and reproducing.

SUMMARY OF THE INVENTION

The present invention is achieved in finding a way to solve the foregoing problem associated with the conventional structure, and it is therefore an object of the present invention to provide an electromagnetic field generating element, an information recording and reproducing head and an information recording and reproducing device that permit attenuation or delay of a magnetic field to be suppressed in high frequency magnetic recording and reproducing by the optically assisted magnetic recording and reproducing technique.

In order to achieve the foregoing object, an electric field generating element in accordance with the present invention is characterized by including:

a light source; and a substrate having formed thereon a conductive member, wherein said conductive member includes a constricting section for narrowing down a current path; and a near field is generated at said constricting section by applying a light beam from said light source to said constricting section.

According to the foregoing structure, the path of the current applied to the conductive member is narrowed down at the constricting section, and a high intensity magnetic field is generated in a vicinity of the constricting section of the conductive member. The magnetic field can be generated from a desired position by forming the constricting section at the position. According to the forgoing structure, since it is not necessary to generate the magnetic field at a desired position by an extended yoke section as in the case of prior art, attenuation or delay of the electric field can be suppressed, thereby providing an electric field generating element suited for high frequency magnetic recording and reproducing.

By supplying current to the conductive member, and applying a laser beam onto the constricting section, the electric field and the near field are generated in a vicinity of the constricting section, it is therefore possible to generate the electric field and the near field at substantially the same position. As a result, the electro magnetic field generating element, which permits the electric field and the near field to be generated from the desired position can be realized with a simple structure.

In order to achieve the foregoing object, an information recording and reproducing head of the present invention is characterized by including the foregoing electric field generating element, and an electric field detector for detecting a light beam, wherein information is recorded at a desired position of the information recording medium by a magnetic field generated at the constricting section by heating the information recording medium by the near field generated from the constricting section, and the information recorded on the heated portion of the information recording medium by the near field is reproduced by detecting by the magnetic field detector, the reflected light beam of the light emitted from the light source to the constricting section.

According to the optically assisted magnetic recording and reproducing device of the present invention for recording and reproducing using the near field by heating a small spot of the information recording medium, the information recording medium can be heated efficiently by the near field, and a magnetic recording can be performed by a high intensity electric field generated in a vicinity of the constricting section. Further, the information on the electric polarization according to a magnetic signal recorded on the information recording medium as heated by the near field can be obtained by detecting by the electro magnetic field detector, the reflected light of the light beam applied to the constricting section from the light source, thereby reproducing information from the information recording medium. According to the forgoing structure, since it is not necessary to generate the magnetic field at a desired position by an extended yoke section as in the case of prior art, attenuation or delay of the electric field can be suppressed, thereby providing an information recording and reproducing head suited for high frequency magnetic recording and reproducing. It is also possible to provide the information recording and reproducing head for optically assisted magnetic recording and reproducing by using the near field at the smaller spot than the diffraction limit of light. Furthermore, as a high intensity near field can be obtained, it is possible to realize a recording and reproducing head for recording and reproducing information on and from the recording medium having high coercive force.

In order to achieve the foregoing object, an information recording and reproducing device is characterized by including the foregoing information recording and reproducing head, and a moving means for moving the information and reproducing head to the desired position of the information recording medium.

According to the foregoing information recording and reproducing device of the present invention which performs optically assisted magnetic recording and reproducing using near field, the information recording and reproducing head can be moved to a desired position of the information recording medium, and recording and reproducing operations can be performed for recording and reproducing information on and from the desired position of the information recording medium by heating the small spot of the information recording medium. Further, using the near field generated from the constricting section, it is possible to heat up the information recording medium efficiently, thereby recording information magnetically onto the information recording medium by the high intensity electric field as generated from the vicinity of the constricting section. Furthermore, the information on electric polarization according to a magnetic signal recorded on the heated portion of the information recording medium by the near field can be obtained by detecting the reflected light beam from the laser beam generating section by the laser beam detecting section, so as to reproduce information from the information recording medium. According to the forgoing structure, since it is not necessary to generate the magnetic field at the desired position by an extended yoke section as in the case of prior art, attenuation or delay of the electric field can be suppressed, thereby providing an information recording and reproducing device suited for high frequency magnetic recording and reproducing. According to the information recording and reproducing device of the present invention, it is also possible to provide the information recording and reproducing device for optically assisted magnetic recording and reproducing by using the near field at the smaller spot than the diffraction limit of light. Furthermore, as the high intensity near field can be obtained, it is possible to realize a recording and reproducing head for recording and reproducing information on and from the recording medium having high coercive force.

Additional objects, advantages and novel features of the invention will be set forth in part in the description which follows, and in part will become apparent to those skilled in the art upon examination of the following or may be learned by practice of the invention.

BRIEF DESCRIPTION OF THE DRAWINGS

FIGS. 18(a) through 18(c) show two types of the electric field generating element in accordance with the second modified example of the fourth embodiment of the present invention, wherein FIG. 18(a) is a common cross sectional view between the two types of the electric field generating element, FIG. 18(b) is a top view illustrating the first type of the electric field generating element, and FIG. 18(c) is a top view illustrating the second type of the electric field generating element.

DESCRIPTION OF THE EMBODIMENTS

First Embodiment

Figure 1:
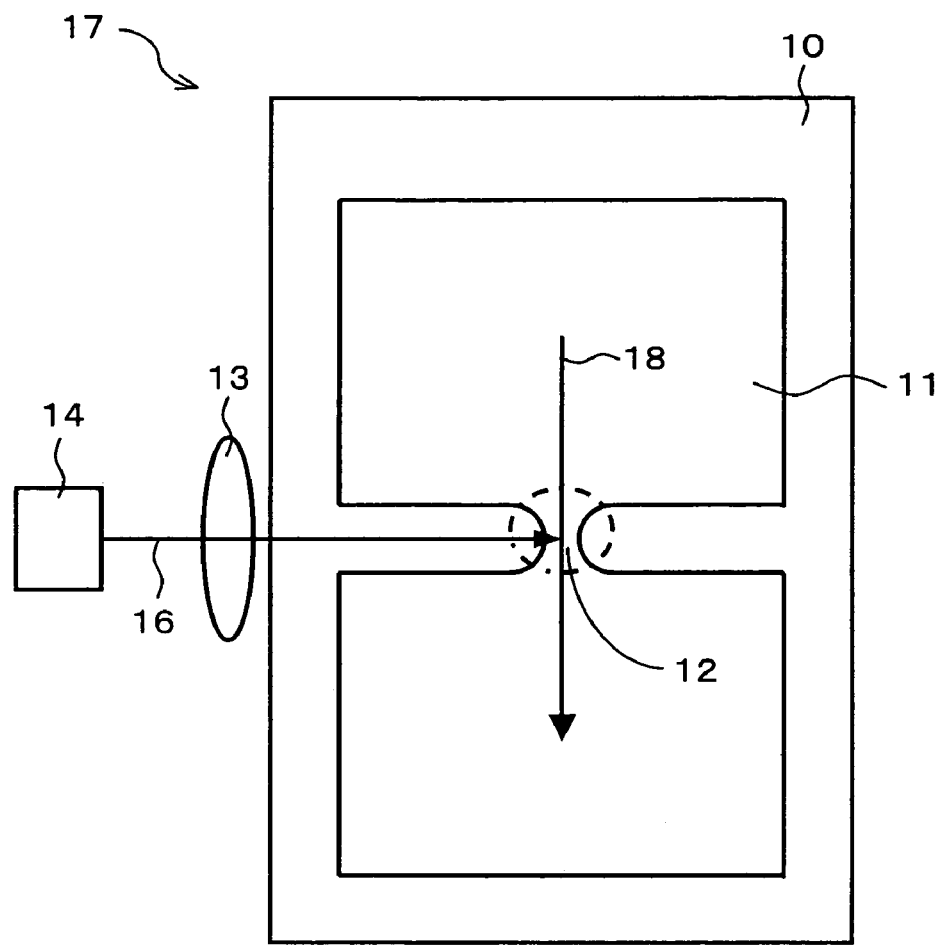
FIG. 1(a) is a top view illustrating the structure of an electric field generating element in accordance with the first embodiment of the present invention.
FIG. 1(b) is a cross sectional view illustrating the structure of the electric field generating element in accordance with the first embodiment of the present invention.
Figure 1:
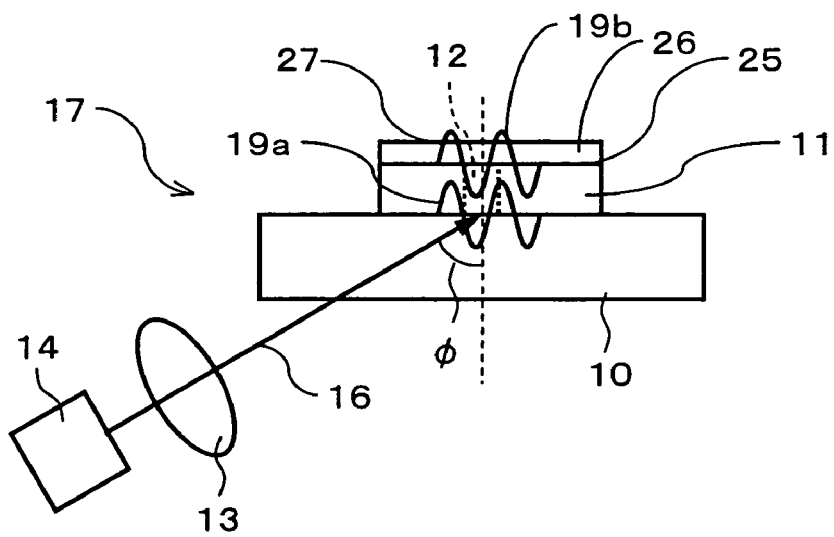

The following descriptions will explain one embodiment of the present invention in reference to FIG. 1 to FIG. 6.

FIGS. 1(a) and 1(b) show the schematic structure of an electromagnetic field generating element 17 in accordance with the first embodiment of the present invention. FIG. 1(a) is a typical depiction showing the electromagnetic field generating element 17 in accordance with the present invention when seen from above. FIG. 1(b) is a typical depiction of the electromagnetic field generating element 17 in accordance with the present embodiment of the present invention when seen from the side. As shown in FIGS. 1(a), and (b), the electromagnetic field generating element 17 includes a substrate having formed thereon a plate type conductive member 11, a laser beam generating section 14 and a converging lens 13. The conductive member 11 has a constricting section 12. This constricting section 12 is formed by opposed recessed sections. These opposed recessed sections are formed by making dints from the both ends of the conductive member 11 at positions crossing the direction of the flow of current 18 at right angle respectively, and each of the recessed sections extends in a direction vertical to the direction of the flow of the current 18 in the conductive member 11 (from the top surface to the bottom surface of the sheet). The laser beam 16 emitted from the laser beam generating section 14 as the light source is incident on the constricting section 12 of the conductive member 11 from under the substrate 10 via the converging lens 13.

The conductive member 11 is made of a metal having high specific electric conductivity such as Au, Pt, Ag, Cu, etc. This substrate 10 is made of a IV group semiconductor such as Si, Ge, etc., a III-V group compound semiconductor represented by GaAs, AlGaAs, GaN, InGaN, InSb, GaSb, AlN, a II-VI group compound semiconductor such as ZnTe, ZeSe, ZnS, ZnO, etc., oxide insulating material such as ZnO, $Al_2O_3$, $SiO_2$, nitride insulating material such as SiN, etc., glass, plastic, etc.

Figure 2:
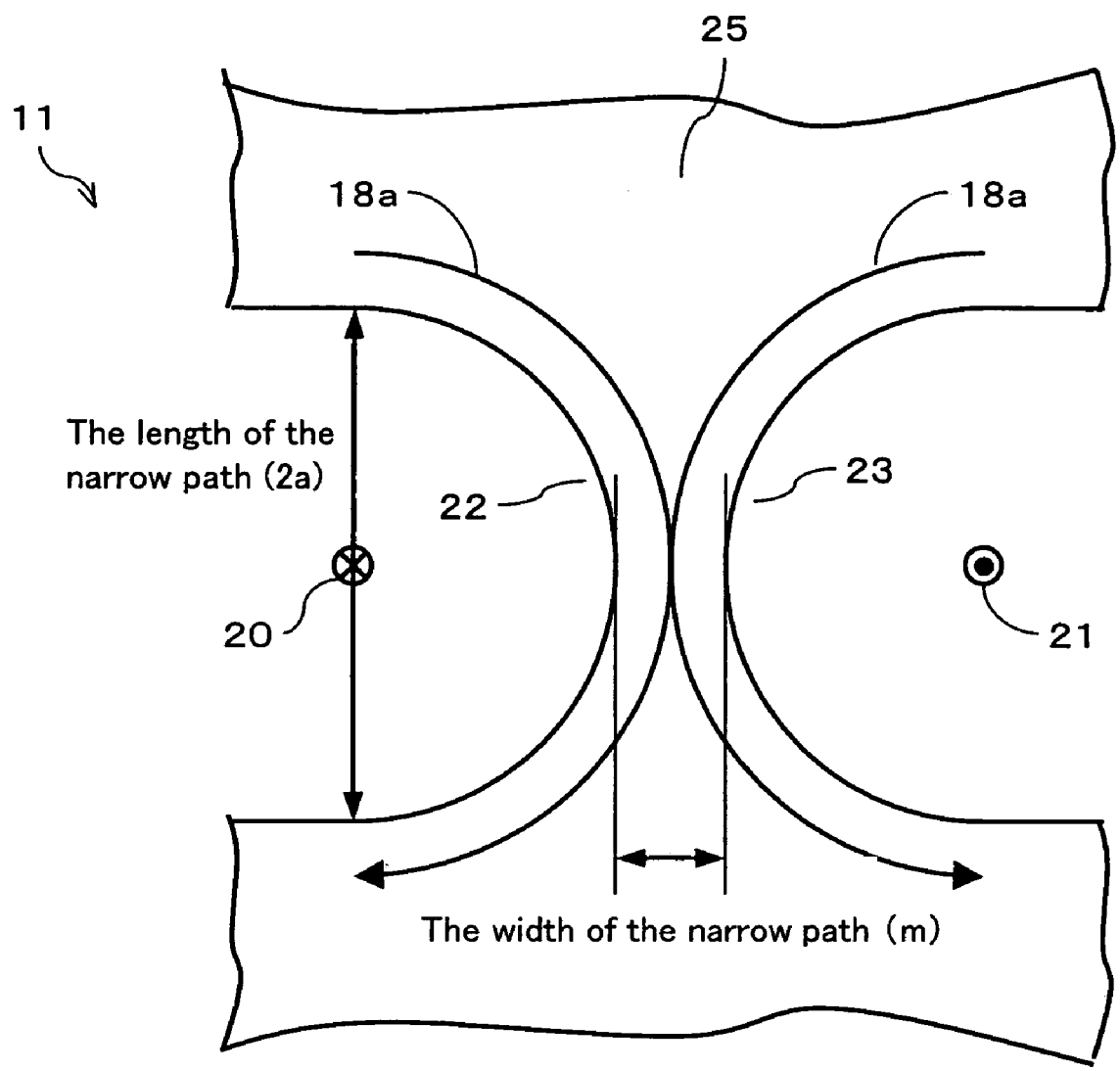
FIG. 2 is an enlarged view of the constricting section of the electric field generating element of FIG. 1.

Next, the structure of the constricting section 12 formed in the band-shaped conductive member 11 and the magnetic field generated from the constricting section 12 will be explained in reference to FIG. 2. FIG. 2 is an enlarged view of the constricting section 12 shown in FIG. 1(a).

As illustrated in FIG. 2, the constricting section 12 has a width of a narrow path m indicative of a distance between rims at the narrowest portion of the conductive member 11 formed by recessed sections which are substantially semi-circular in shape. Here, the diameter $2\alpha$ of each of the substantially semicircular recessed sections is twice as long as the distance from the center 20 (21) to the rim of each of the substantially semi-circular recessed sections of the conductive member 11. Here, the thickness of the constricting section 12 is selected to be not larger than a wavelength of the laser beam emitted from the laser beam generating section 14.

When current 18 is applied to the conductive member 11, the current 18 flows in an U-shaped path as indicated by the reference numerals 18a and 18b in FIG. 2 along the rims of the constricting section 12. By the right handed screw rule, the magnetic field is generated around the constricting section 12 in a direction from the front surface to the back surface of the sheet at the side face 22 on the right hand side of the constricting section 12 with respect to the current direction, and is generated in the direction from the back surface to the front surface of the sheet at the side face 23 on the left hand side of the constricting section 12 with respect to the current direction, and this magnetic field has a direction in parallel to the surface 25 (see FIG. 1(b)) of the constricting section 12 at portion above the surface 25. This magnetic field has substantially the same intensity in a vicinity of the side face 22 and a vicinity of the side face 23.

The magnetic field intensity H at the center 20 (21) is given by the following formula in which $2a$ indicates the length of the constricting section 12, m indicates a line width of the constricting section 12, and I indicates a current.

$$H = \frac{I}{4m} \ln\left(\frac{m+a}{a}\right)$$

For example, in the case where the constricting section 12 has a length $2\alpha$ of the narrow path of 1 μm, a line width m of 1 μm, and current I of 100 mA, the intensity of the magnetic field at the center 20 (21) of each of the substantially semicircular recessed section is given as 17.3 kA/m (218 Oe).

As is clear from the formula, by setting the line width m of the constricting section 12 small, the high intensity magnetic field can be generated at around the constricting section 12. It is therefore preferable that the line width m of the constricting section 12 be set not more than 1 μm. However, when the current 18 that flows in the conductive member 11 is large, the constricting section 12 may be damaged by the electric resistance. In response, for example, when the current 18 of around 100 mA is applied to the conductive member 11, it is preferable that the cross section of the constricting section 12 in the direction substantially vertical with respect to the lengthwise direction of the constricting section 12 be larger than 6400 nm², and the length 2a of the constricting section 12 be not more than 20 μm.

Next, the surface plasmon excitation of the emitted laser beam 16 from the laser beam generating section 14 (light source) incident on the constricting section 12 of the conductive member 11 will be explained in reference to FIG. 1(*b*).

By projecting the laser beam 16 from the laser beam generating section 14 onto the constricting section 12 via the converging lens 13 from the side of the substrate 10, the surface plasmon 19*a* is excited between the substrate 10 and the conductive member 11 with the electric field vector vertical to the interface. Furthermore, depending on the thickness of the constricting section 12, the surface plasmon is excited also at the surface 25 of the conductive member 11 facing the interface between the substrate 10 and the constricting section 12. Here, it is desirable that the electric field vector of the laser beam emitted from the constricting section 12 be p-wave vertical to the surface parallel to the surface having formed thereon the conductive member 11 of the substrate 10.

To make the surface plasmon excited also at the surface 25 of the conductive member 11 facing the interface between the substrate 10 and the constricting section 12, it is necessary to set the thickness of the constricting section 12 be smaller than the intrusion length of the surface plasmon. Here, the intrusion length of the surface plasmon indicates the length from the interface having electric field components in a range of $e^{-1}$ to 0.368 when the electric field component at the interface of the incident light is set 1.

The birefringence and the intrusion length d for generating the surface plasmon 19*a* are indicated by birefringence $N_{metal}$ of the metal (conductive member 11 in this example), and the wavelength λ and the incident angle φ of the emitted light (emitted laser beam 16). Here, the birefringence $N_{metal}$ of the metal is given by the formula: $N_{metal}=n_{metal}+ik_{metal}$ (i indicates an imaginary unit), wherein $N_{metal}$ indicates an index of refraction of metal (real part), and $k_{metal}$ indicates an extinction coefficient (imaginary part). $N_i=n_i+ik_i$ (i indicates an imaginary unit, and $n_i$ satisfies the condition of $k_i \leq n_i \leq 0$).

Here, the condition with regard to the birefringence to generate the surface plasma 19*a* is given by the following formula wherein an extinction coefficient $k_i=0$ as the substrate 10 is transparent and allow the laser beam pass through it.

$$n_i^2 \sin^2\phi - k_{metal}^2 + n_{metal}^2 < 0$$

The intrusion length d of the surface plasmon is given by the following formula when the condition for the complex index of refraction that generates the surface plasma 19*a* satisfies the following formula.

$$d = \frac{\lambda}{2\pi}\sqrt{k_{metal}^2 + 2n_{metal}k_{metal} - n_{metal}^2 - n_i^2\sin^2\phi}$$

For example, under the conditions of the wavelength of the emitted laser beam λ=780 nm, the incident angle of the emitted laser beam 16φ=85°, and the index of refraction of the substrate 10 ($n_i$=2.3) (ZnS, for example), the intrusion length d of the surface plasmon is around 450 nm when adopting the conductive member 11 made of a metal having an index of refraction of the metal ($n_{metal}$) smaller than 1, and an extinction coefficient ($k_{metal'}$) larger than 3 such as Au, Ag, etc., and the intrusion length d of the surface plasmon is around 770 nm when adopting the conductive member 11 made of a metal having an index of refraction of the metal ($n_{metal}$) larger than 1, and an extinction coefficient ($k_{metal}$) larger than 3 such as Pt, Al, Pd, etc. On the other hand, under the conditions of the wavelength of the emitted laser beam λ=400 nm, and the incident angle φ of the emitted laser beam 16φ=85°, the intrusion length d of the surface plasmon is around 230 nm when adopting the conductive member 11 made of Au, Ag, etc., and the intrusion length d of the surface plasmon is around 395 nm when adopting the conductive member 11 made of Pt, Al, Pd, etc. Here, in order to prevent the damage on the constricting section 12 when the current 19 is applied to the conductive member 11, the line width m of the constricting section 12 is selected so as to have the cross section area of around 6400 nm² or larger.

For example, under the conditions in which the constricting section 12 has a rectangular cross section, the emitted laser beam 16 has a wavelength λ of 780 nm, the incident angle φ of the emitted laser beam 16 is 85°, and the index of refraction $n_i$ of the substrate 10 is 2.3 (ZnS, for example), the line width m of the constricting section 12 is around 15 nm when adopting the conductive member 11 made of such metal as Au, Ag, etc., and the line width m of the constricting section 12 is around 9 nm when adopting the conductive member 11 made of such metal as Pt, Al, Pd, etc. On the other hand, under the conditions in which the laser beam 16 has a wavelength λ of 400 nm, and the incident angle φ of the laser beam 16 is 85°, the line width m of the constricting section 12 is around 28 nm when adopting the conductive member 11 made of such metal as Au, Ag, etc., and the line width m of the constricting section 12 is around 17 nm when adopting the conductive member 11 made of such metal as Pt, Al, Pd, etc.

The thickness of the constricting section 12 is set the intrusion length of the surface plasmon or shorter, and when the emitted laser beam 16 is incident on the constricting section 12, the surface plasmon 19*b* is excited at the interface between the constricting section 12 and substrate 10 and at the surface 25 facing the interface between the constricting section 12 and the substrate 10, and the near field is generated from the surface 25 facing the interface between the constricting section 12 and the substrate 10. Furthermore, at least at the constricting section 12 of the surface 25 facing the interface between the constricting section 12 and the substrate 10, i.e., the surface 25 of the substrate 10 on an opposite side to the interface with the conductive member 11, is coated with a coating layer 26 made of a material having the same index of refraction $n_i$ as the substrate 10 (see FIG. 1(*b*)), displacement in phases of the surface plasmon excited at respective interfaces of the constricting section 12, i.e., the interface with the substrate 10 and the interface with the coating layer 26 can be suppressed. As a result, efficient resonance of the surface plasmon excited at both interfaces can be realized, thereby generating the near field of still higher intensity from the surface 27 of the coating layer 26.

As described, according to the electromagnetic field generating element 17 of the present embodiment, when a current 18 is applied to the conductive member 11, the electric field is generated in a direction parallel to the surface 25 of the constricting section 12, and when a laser beam 16 is projected from the side of the substrate 10 onto the constricting section 12, the surface plasmon is excited by the electric field vector vertical to the surface 25 of the constricting section 12, thereby generating the near field from the surface 25 of the constricting section 12.

According to the forgoing structure, since it is not necessary to generate the magnetic field from the desired position by an extended yoke section as in the case of prior art, attenuation or delay of the electric field can be suppressed, thereby providing an electric field generating element suited for high frequency magnetic recording and reproducing. Further, by supplying current 18 to the conductive member 11, and applying a laser beam 16 onto the constricting section 12, the electric field and the near field are generated in a vicinity of the constricting section 12, and the electric field and the near field are generated at substantially the same position. As a result, the electromagnetic field generating element 17 which permit the electric field and the near field to be generated from the desired position can be realized with simple structures.

The electromagnetic field generating element 17 of the present embodiment which permit the electric field and the near field to be generated from substantially the same position in a vicinity of the constricting section 12, it is possible to control whether or not to generate the electric field or near field.

Next, other structures of the constricting section 12 provided in the conductive member 11 will be explained in reference to FIG. 3 to FIG. 6. It should be noted here that for the electric field generating elements shown in FIG. 3 through FIG. 6, the laser beam generating section 14 and the converging lens 13 are omitted.

Figure 3:
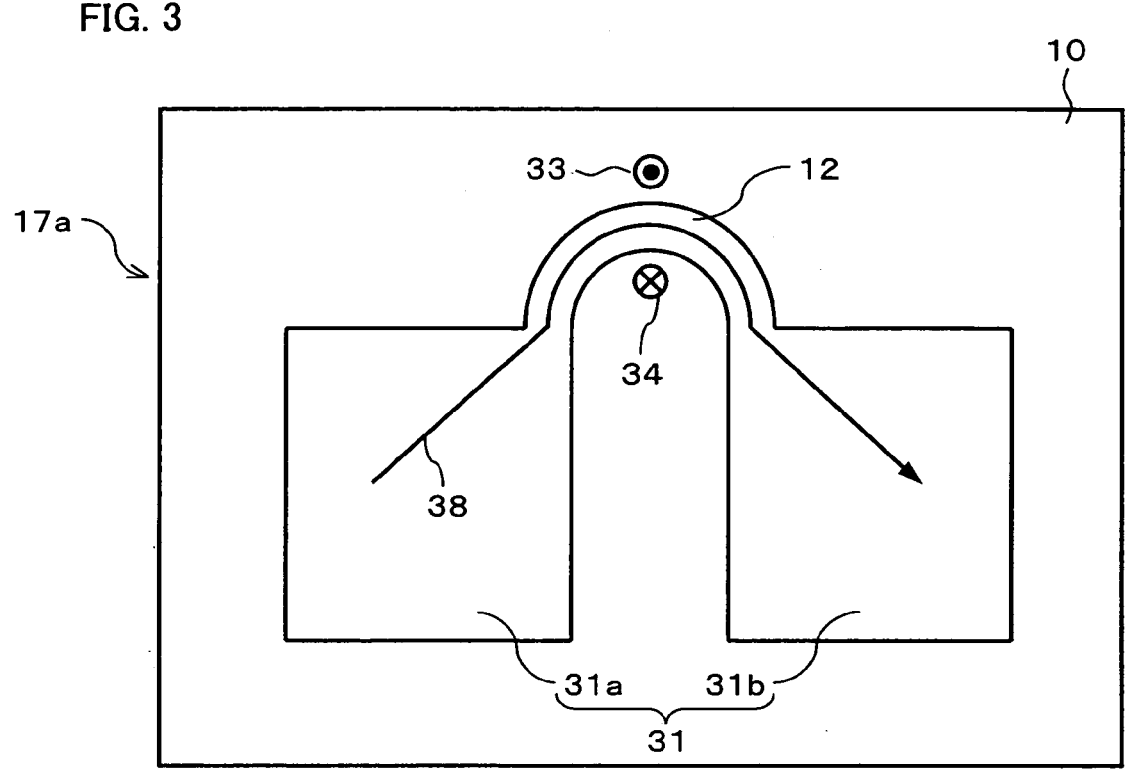
FIG. 3 is a top view illustrating the structure of the electric field generating element in accordance with the first modified example of the first embodiment of the present invention.

FIG. 3 is a top view illustrating the structure of the electric field generating element in accordance with the first modified example wherein the constricting section is formed in the conductive member having two terminals. As illustrated in FIG. 3, the electro magnetic field generating element 17b of the first modified example includes the substrate 10 and the plate type conductive member 31 formed on the substrate 10. The conductive member 31 includes two rectangular plate type terminals 31a and 31b placed in parallel, and the constricting section 12 that connects the terminal 31a and the terminal 31b. The constricting section 12 is an arc shaped conductive layer that is protruded in a direction apart from both the terminal 31a and the terminal 31b on the laminated surface. In other words, the constricting section 12 is formed on the conductive member 31 so as to extend in a direction vertical to the direction of current 38 on the laminated surface (the direction from the bottom surface to the top surface of the sheet) by making one of side end in the current direction recessed and the other side end protruded.

When a current 38 is applied from the terminal 31a to the terminal 31b, the flow of current 38 is narrowed down at the constricting section 12. Here, the electric field generated in a vicinity of the constricting section 12 has a direction from the back surface to the front surface of the sheet at the side face 33 on the left side with respect to the current direction of the constricting section 12, i.e., the direction from the front surface to the back surface at the side face 34 on the right side with respect to the current direction by the right handed screw rule. The density of the current 38 in the constricting section 12 becomes larger towards the bottom surface of the constricting section (side face 34), and the electric field intensity of the constricting section 12 becomes higher on the side of the side face 34, and lower on the side face 33. Therefore, the constricting section 12 formed in the foregoing structure is suited for generating the electric field vertical in a vicinity of the side face 34 of the constricting section 12.

Figure 4:
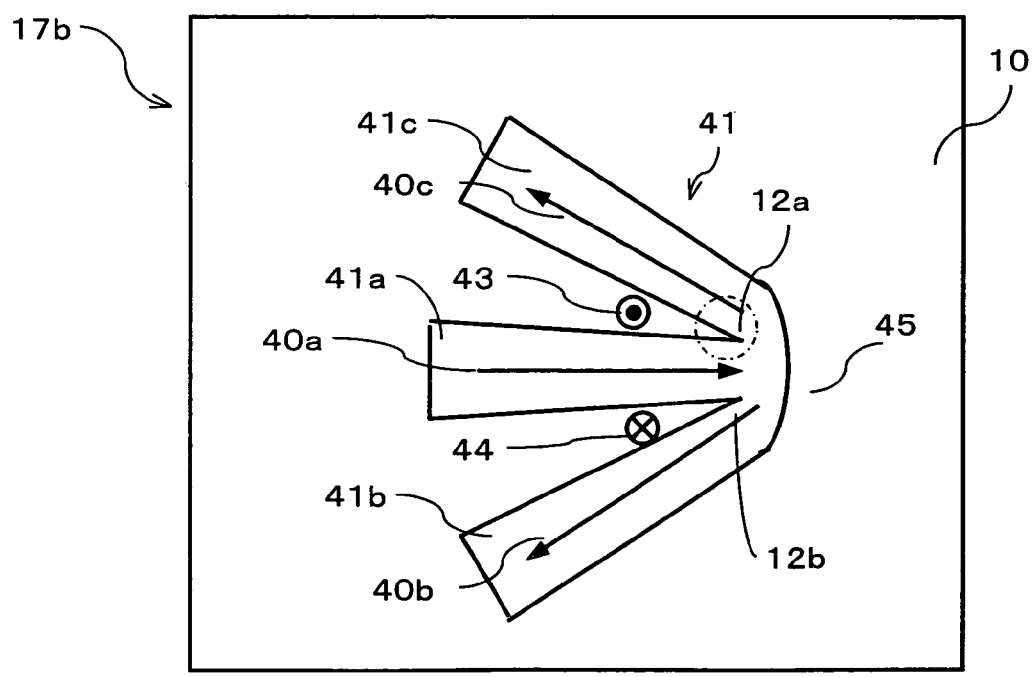
FIG. 4 is a top view illustrating the structure of the electric field generating element in accordance with the second modified example of the first embodiment of the present invention.

FIG. 4 is a top view illustrating the structure of the electric field generating element in accordance with the second modified example wherein the constricting section is formed in the conductive member having three terminals. As illustrated in FIG. 4, the electromagnetic field generating element 17b in accordance with the second modified example is arranged such that a plate type conductive member 41 with three terminals 41a, 41b and 41c is layered on the substrate 10. These terminals 41a, 41b and 41c are connected at one location, and are formed in a radius pattern so as to extend from the connected part respectively. In this structure, current 40a flows to the connection point from the radius end of the terminal 41a of the conductive member 41, and the current 40b and the current 40c flow to the respective radius ends of other two terminals 40b and 40c from the connected part. The terminal 41b and the terminal 41c are provided so as to sandwich the terminal 41a.

The respective radius angles of the terminals 41a, 41b and 41c are set such that an angle formed between the current path of the current 40a and the current path of the current 40b, and an angle formed between the current path of the current 40 and the current path of the current 40c are acute respectively. The constricting section for narrowing down the current path is formed at the connected part of the terminals 41a, 41b and 41c, the constricting section 12b is formed at a connected part of the terminal 41a and the terminal 41b, and the constricting section 12a is formed at the connected part of the terminal 41a and the terminal 41c.

Here, the electric field at the constricting section 12a is exerted in the direction from the back surface to the front surface of the sheet as being intensified by the current 40a and the current 40c at the side face 43 between the terminal 41a and the terminal 41c, and the electric field at the constricting section 12b is exerted in the direction from the front surface to the back surface of the sheet as being intensified by the current 40a and the current 40b at the side face 44 between the terminal 41a and the terminal 41b. On the other hand, the electric field exerted at the side face 45 on the side opposite to the side between the terminal 41b and the terminal 41c has a lower intensity than those of the electric field exerted at the side face 43 and the side face 44 because the current that flows from the terminal 41a to the terminal 41b has an opposite direction to the current that flows from the terminal 41a to the terminal 41c, and the respective electric fields generated by these currents are cancelled out. With this structure, it is possible to raise the electric field intensity in a direction parallel to the surface of the constricting section as compared to the structure shown in FIG. 1.

Figure 5:
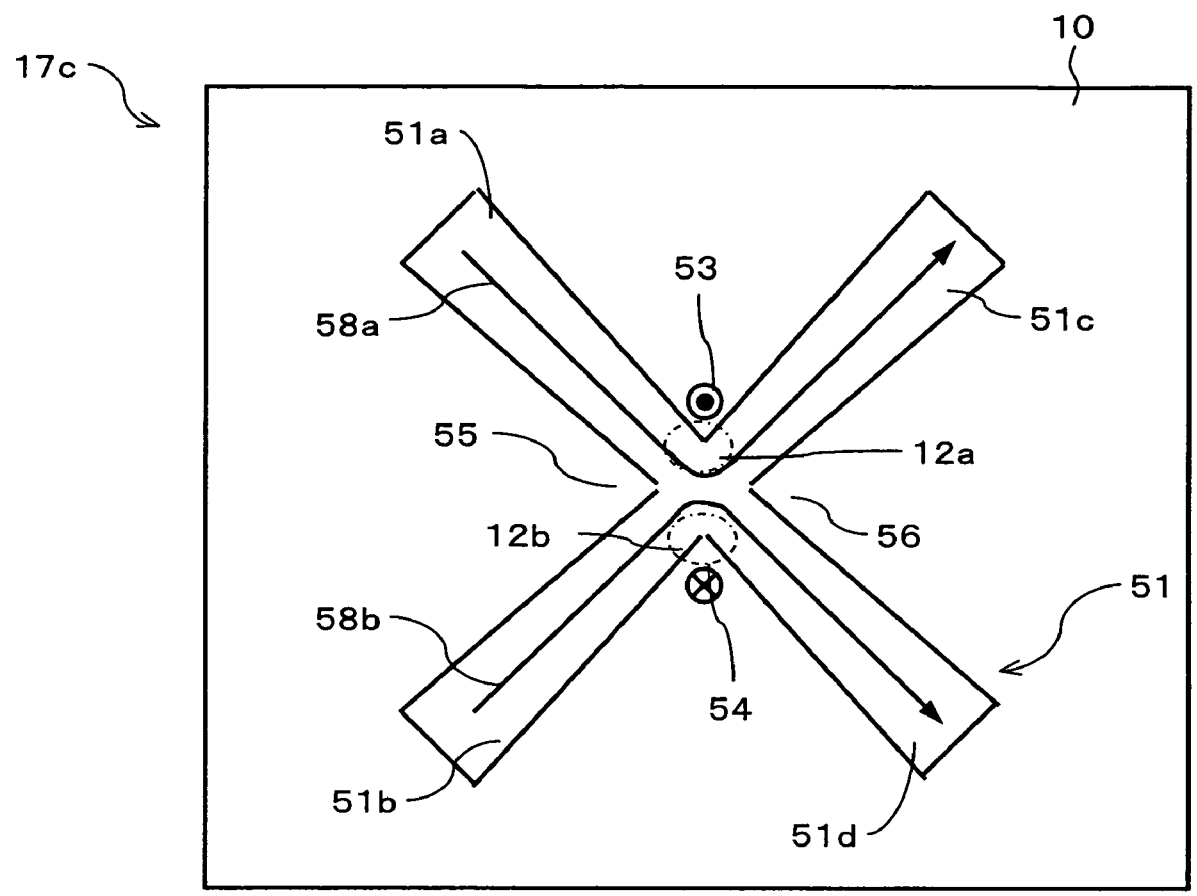
FIG. 5 is a top view illustrating the structure of the electric field generating element in accordance with the third modified example of the first embodiment of the present invention.

FIG. 5 is a top view illustrating the structure of the electric field generating element in accordance with the third modified example wherein the constricting section is formed in the conductive member having four terminals. As illustrated in FIG. 5, the electromagnetic field generating element 17c in accordance with the third modified example is structured such that the plate type conductive member 51 having four terminals 51a, 51b, 51c and 51d is formed on the substrate 10. These terminals 51a to 51d are connected at one location, and are extended from the connected part in a radius pattern in all directions. In FIG. 5, these four terminals 51a to 51d are provided in the order of the terminal 51a, the terminal 51c, the terminal 51d and the terminal 51b in the clockwise direction. In this structure, current 58a flows from the end of the radius pattern of the terminal 51a to the connected part, and further flows from the connected part to the end of the radius pattern of the terminal 51c adjacent to the terminal 51a. Here, the current path is narrowed down by the constricting section 12a formed at the connection between the terminal 51a and the terminal 51c.

Incidentally, the current 58b flows from the end of the radius pattern of the terminal 51b to the connected part, and further flows from the connected part to the end of the radius pattern of the terminal 51d adjacent to the terminal 51b. In this state, the current path is narrowed down by the constricting section 12b formed in the connected part between the terminal 51b and the terminal 51d.

In the case where the current 58a and the current 58b have the same current value, by the right handed screw rule, at the side face 53 of the connected part on the side where the constricting section 12a is formed, the electric field is generated from the back surface to the front surface of the sheet, and at the side face 54 of the connected part on the side where the constricting section 12b is formed, the electric field is generated from the front surface to the back surface of the sheet. As a result, respective electric fields have the same intensity. Incidentally, by the current 58a and the current 58b, the electric field exerted at the side face 55 of the connected part between the terminal 51a and the terminal 51b, and the electric field exerted at the side face 56 of the connected part between the terminal 51c and the terminal 51d are cancelled out. With this structure, it is therefore possible to control the electric field generation area by altering the path of the current that flows from respective terminals of the conductive member 51.

Figure 6:
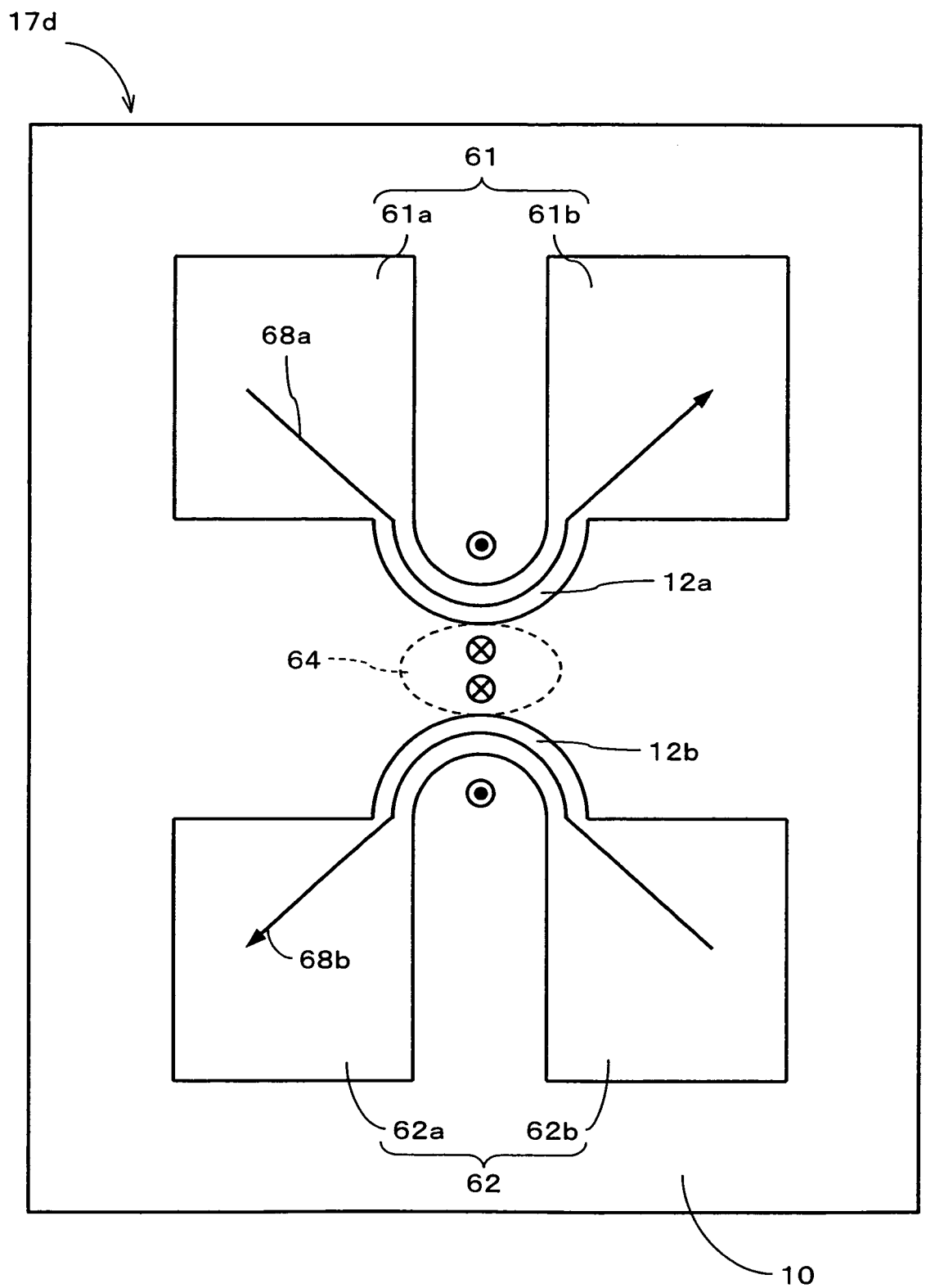
FIG. 6 is a top view illustrating the structure of the electric field generating element in accordance with the fourth modified example of the first embodiment of the present invention.

FIG. 6 is a top view illustrating the structure of the electric field generating element in accordance with the forth modified example wherein the constricting section is formed in the conductive member having four terminals. As illustrated in FIG. 6, the electromagnetic field generating element 17d in accordance with the fourth modified example adopts two conductive members with two terminals which are connected by conductive members in arc shape having protruded sections wherein on the substrate 10, one of the protruded sections is placed so as to oppose the other protruded section as explained in the first modified example (FIG. 3). In the case where a) the current supplied to one of the conductive members, i.e., the conductive member 61, flows from the terminal 61a of the conductive member 61 to the terminal 61b of the conductive member 61, and b) the current 68b applied to the other conductive member 62 flows from the terminal 62b opposing the terminal 61b to the terminal 62a opposing the terminal 61a, i.e., in an opposite direction to the direction of the current 68a, in an area 64 between the protruded section of the constricting section 12a of the conductive member and the protruded section of the constricting section 12b of the conductive member 62, the electric field is intensified in the direction from the front surface to the back surface of the sheet, and the electric field intensity twice as large as that obtained from the structure of the first modified example can realized. Here, by connecting one of the terminals of the opposed conductive member 61 and the conductive member 62 along the current direction, it is possible to generate the electric field by the same current source.

Second Embodiment

The following descriptions will explain another embodiment of the present invention in reference to FIG. 7 to FIG. 12. For ease of explanation, members (structures) having the same functions as those shown in the drawings pertaining to the first embodiment above will be given the same reference symbols, and explanation thereof will be omitted here.

Figure 7:
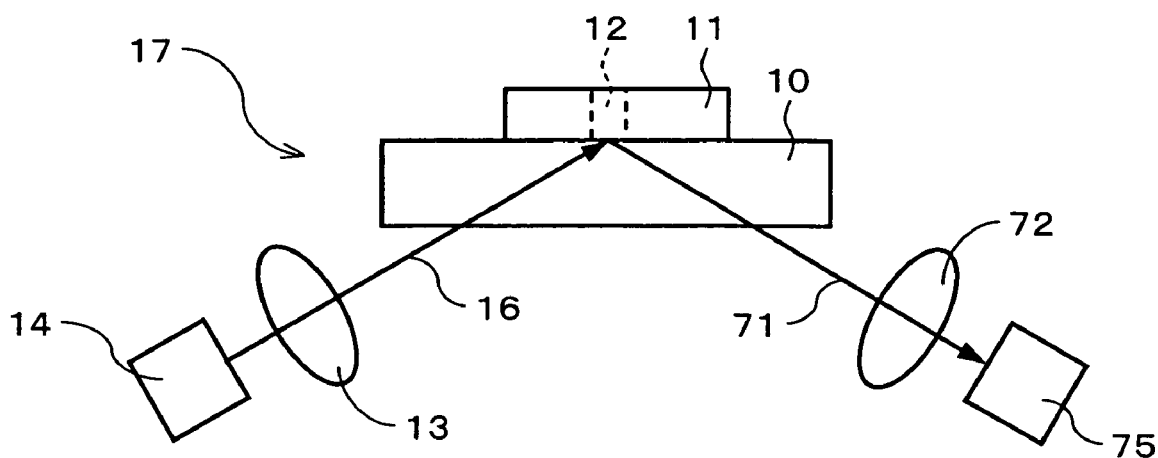
FIG. 7 is a cross sectional view showing the structure of an electric field generating element and the arrangement of an electric field detector in accordance with the second embodiment of the present invention.

FIG. 7 is a cross sectional view of the structure wherein the electromagnetic field generating element 17 of the first embodiment is provided with an electric field detector. As illustrated in FIG. 7, in the second embodiment of the present invention, when a laser beam 16 is applied to the constricting section 12 in the electromagnetic field generating element 17, the reflected laser beam 17 as reflected in all directions at the constricting section 12 is converged onto a laser beam detecting section 75 (electric field detector) via the converging lens 71.

This laser beam detecting section 75 can detect an external electric polarization in a vicinity of the constricting section 12 by detecting changes in polarization direction and changes in intensity of the reflected laser beam 71 as reflected from the constricting section 12 of the electromagnetic field generating element 17 generating the near field and the electric field. Namely, in the case where the external electric polarization exists in a vicinity of the constricting section 12, the external electric polarization and the polarization of the surface plasmon of the constricting section 12 are mutually interacted. As a result, the laser beam detecting section 75 can detect the external electric polarization in a vicinity of the constricting section 12. For example, when the magnetic recording medium is heated by the near field, the electric polarization occurs from the recording mark at the heated region. Then, the mutual interaction between the electric polarization according to a recording mark and the near field is detected by the laser beam detecting section 75 as changes in polarization direction and the intensity of the reflected laser beam 71, thereby reading information from the magnetic recording medium.

Next, other laser beam incident states and laser beam detecting states will be explained in reference to FIG. 8 to FIG. 10.

Figure 8:
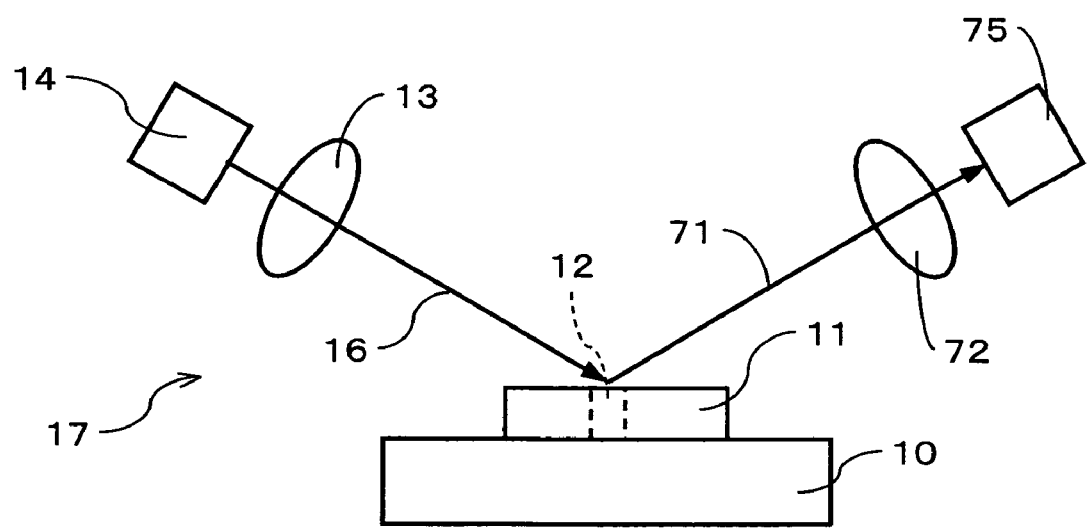
FIG. 8 is a cross sectional view illustrating the structure of a magnetic field generating element and the arrangement of a magnetic field detector in accordance with the first modified example of the second embodiment of the present invention.

FIG. 8 is a cross sectional view of the structure in accordance with the first modified example of the second embodiment wherein the electromagnetic field generating element 17 is provided an electric field detector. As illustrated in FIG. 8, in the first modified example, the substrate 10 does not allow the laser beam 16 to pass therethrough. In this structure, when the laser beam 16 is emitted from the laser beam generating section 14 onto the laser constricting section 12 from the side of the conductive member 11, and the laser beam 71 reflected from the constricting section 12 in all directions is converged at the converging lens 72, by detecting changes in polarization direction and the intensity of the reflected laser beam 17 by the laser beam detecting section 75, it is possible to detect the external electric polarization.

Figure 9:
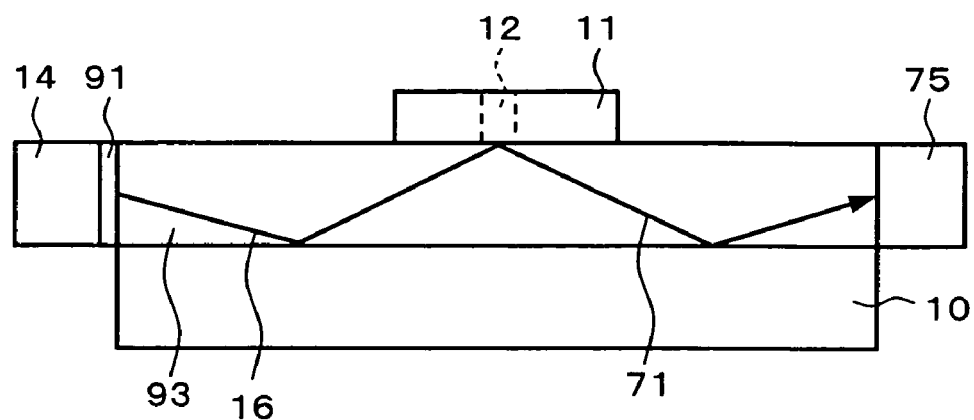
FIG. 9 is a cross sectional view illustrating the structure of a magnetic field generating element and the arrangement of a magnetic field detector in accordance with the second modified example of the second embodiment of the present invention.

FIG. 9 is a cross sectional view of the modified second example of the electromagnetic field generating element 17 provided with the electric field detector. As illustrated in FIG. 9, in the second modified example, a light guide 93 is formed on the substrate 10, and the conductive member 11 having the constricting section 12 is formed on the light guide 93. The laser beam generating section 14 and the laser beam detecting section 75 are provided so as to sandwich the light guide 93 in between, and the laser beam 16 emitted from the laser beam generating section 14 is projected onto the constricting section 12 of the conductive member 12, and the reflected light beam 71 as being reflected from the conductive member 12 in all directions within the light guide 93 is incident on the laser beam detecting section 75. Here, by arranging so as to form an anti-reflection film 91 between the laser beam generating section 14 and the light guide 93, the light reflected at the light guide 93 can be prevented from entering back to the laser beam generating section 14. As a result, the S/N ratio of the external electric polarization as detected by the laser beam detecting section 75 can be improved.

Here, the film thickness b of the anti-reflection film 91 is given by the formula $b=\lambda/4 n_1$ wherein $n_1$ indicates the index of refraction of the anti-reflection film 91, and $\lambda$ indicates the wavelength of the anti-reflection film 91.

For example, for the laser beam 16 having a wavelength of 780 nm, when adopting the light guide 93 made of glass, it is preferable that the anti-reflection film 91 be made of $MgF_2$ ($n_1$=around 1.35), and have a thickness of around 144 nm. On the other hand, when adopting the light guide 93 made of As compound semiconductor (GaAs, AlAs, InAs), it is preferable that the anti-reflection film 91 be made of $Al_2O_3$ ($n_1$=around 1.8), and have a thickness of around 108 nm. For example, for the laser beam 16 having a wavelength of 400 nm, when adopting the light guide 93 made of nitride compound semiconductor such as AlN, GaN, InN, it is preferable that the anti-reflection film 91 be made of $SiO_2$ ($n_1$=around 1.5), and have a thickness of around 67 nm.

Figure 10:
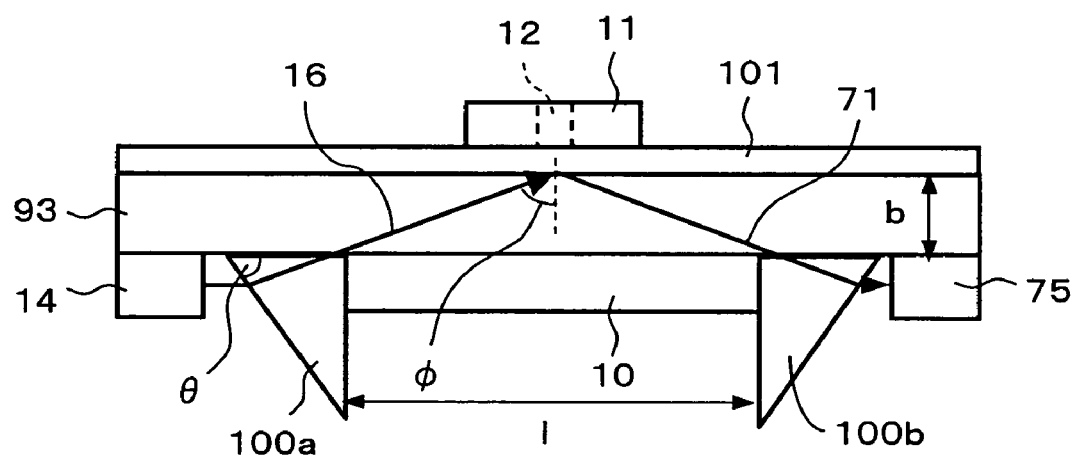
FIG. 10 is a cross sectional view illustrating the structure of the magnetic field generating element and the arrangement of the magnetic field detector in accordance with the third modified example of the second embodiment of the present invention.

FIG. 10 is a cross sectional view of the structure in accordance with third modified example of the second embodiment wherein the electromagnetic field generating element 17 is provided with an electric field detector. As illustrated in FIG. 10, in the third modified example, the light guide 93 is formed on the substrate 10. Further, a prism 100a and a prism 100b are provided so as to sandwich the substrate 10 in a direction vertical to the normal line of the substrate surface, and the laser beam generating section 14 and the laser beam detecting section 75 are provided so as to sandwich the prism 100a and the prism 100b in a direction vertical to the normal line of the substrate surface. Further, a low index of refraction film 101 is formed on the surface of the light guide 93 on the opposite side to the surface facing the substrate 10. A conductive member 11 having a constricting section 12 is formed on the surface of the low index of refraction film 101 on the opposite side to the surface facing the light guide 93.

A laser beam 16 emitted from the laser beam generating section 14 is reflected in all directions from the low index of refraction film 101 at a part right under the constricting section 12 of the conductive member 11 from the light guide 93 via the prism 100a. The laser beam 71 reflected in all directions is incident on the laser beam detecting section 75 via the prism 100b. Here, the incident angle with respect to the wavelength of the laser beam 16 is selected so that the surface plasmon is excited at the interface between the low index of refraction film 101 at the part right under the constricting section 12 of the conductive member 11 and the light guide 93. For example, when adopting the laser beam 16 having a wavelength of 780 nm, both an angle θ formed by the laser receiving face of the prism 100a and the light guide 93 and an angle formed by the laser emitting face of the prism 100b and the light guide 93 are selected to be 60° respectively under the following conditions: Prisms 100a and 100b and the substrate 10 are made of glass (index of refraction of around 1.4), a distance 1 between prisms is around 2 μm, the thickness of the light guide 93 is around 300 nm, the low index of refraction film 101 is made of $MgF_2$ or LiF (having an index of refraction of around 1.35), and the laser beam 16 is incident on the film 101 having a low index of refraction of around 80°.

It may be arranged such that prisms 100a, 100b, the laser beam generating section 14 and the laser beam detecting section 75 are provide on the side of the conductive member 11.

Figure 11:
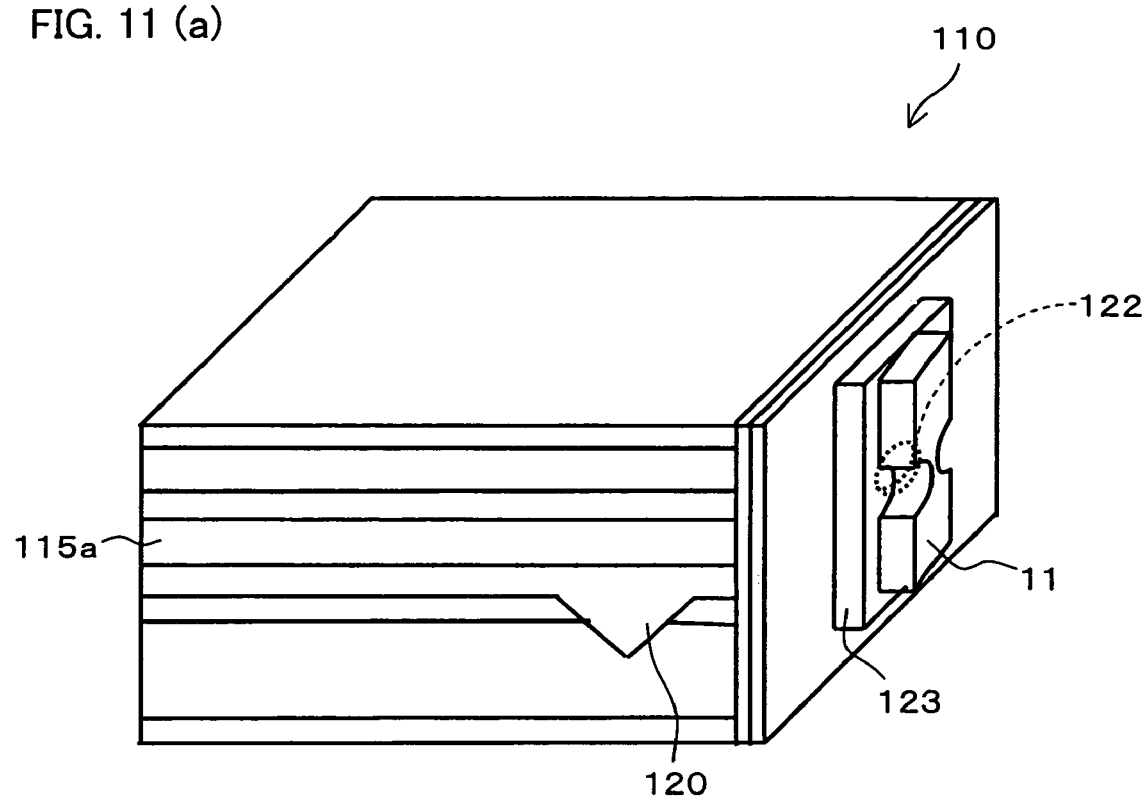
FIG. 11(a) is a perspective view illustrating the structure of the electric field generating element integrally formed with the semiconductor laser element in accordance with the second embodiment of the present invention.
FIG. 11(b) is a cross sectional view illustrating the structure of the electric field generating element integrally formed with the semiconductor laser element in accordance with the second embodiment of the present invention.
Figure 11:
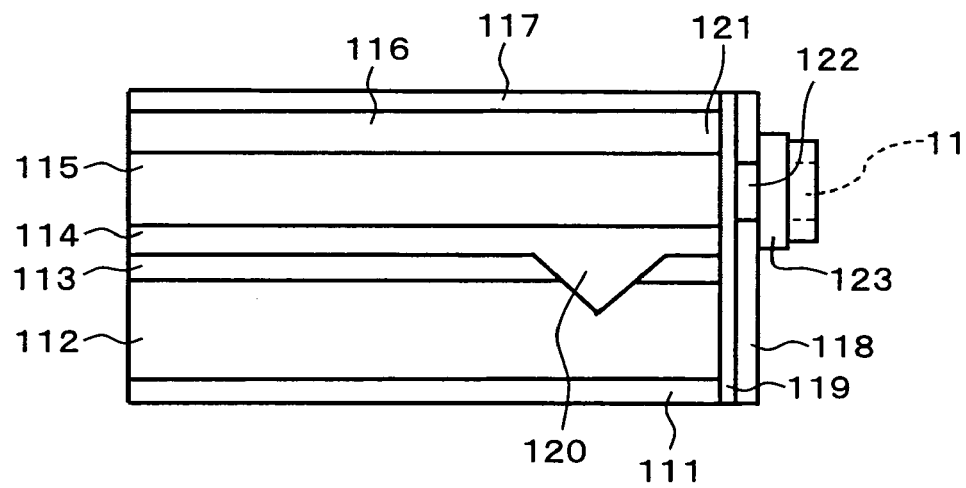
Figure 12:
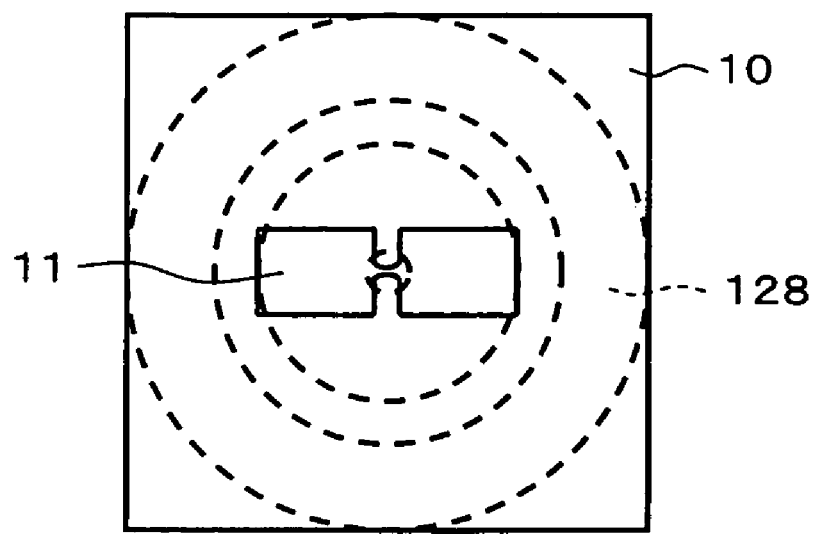
FIG. 12(a) is a top view illustrating the structure of the electric field generating element integrally formed with the semiconductor laser element in accordance with a modified example of the second embodiment of the present invention.
FIG. 12(b) is a cross sectional view illustrating the structure of the electric field generating element integrally formed with the semiconductor laser element in accordance with a modified example of the second embodiment of the present invention.
Figure 12:
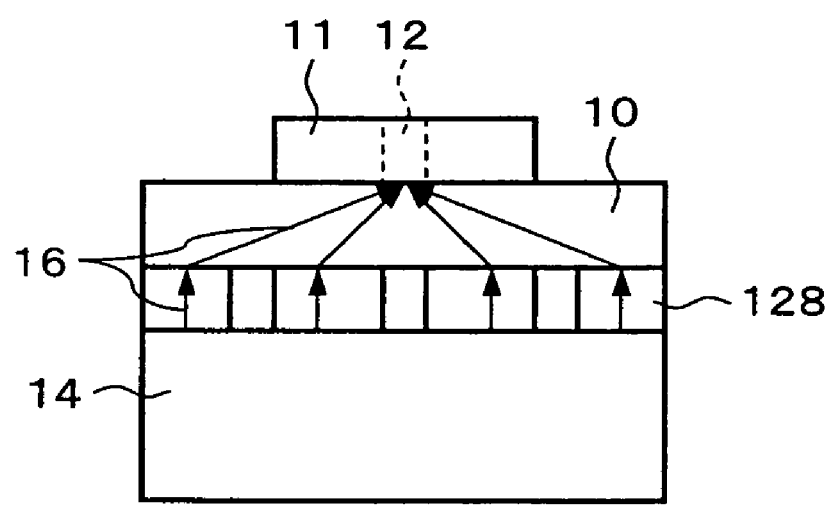

Next, the electric field generating element wherein the semiconductor laser element is adopted as the laser beam generating section, and the conductive member having the constricting section, and the laser beam generating section are formed in one integral part will be explained in reference to FIG. 11 and FIG. 12.

FIGS. 11(a) and 11(b) show one example of the electric field generating element wherein the conductive member having the constricting section and the laser beam generating section are, formed in one integral part. FIG. 11(a) is a perspective view of the electric field generating element, and FIG. 11(b) is a cross sectional view at substantially the center in the depth direction of the electric field generating element.

For the semiconductor laser element 110, adopted is a semiconductor laser element 110 having the VSIS structure. This semiconductor laser element 110 includes an p-Au electrode 111, an p-GaAs substrate 112, n-GaAs current closing layers 113, p-AlGaAs lower clad layer 114, an p-AlGaAs active layer 115 (light emitting layer), n-AlGaAs upper clad layer 116, and an n-Au electrode 117 laminated in this order from the bottom in FIG. 11(b). The current closing layer 113 is formed on both sides in the widthwise direction with a predetermined interval in between, and between the current closing layers 113 on both sides in the widthwise direction, a stripe section 120 of the lower clad layer 114 is formed. The stripe section 120 of the lower clad layer 114 has a cross section of substantially reversed triangular in shape. This tripe section 120 is located at substantially the center in the widthwise direction of an optical element and extends to the depth. A laser resonator is formed by the end face at the front side and the end face at the back side of an active layer 114 in FIG. 11(a). An opening 122 as a surface plasmon extracting section is provided at the side of the active layer 115 (light emitting layer), and in this opening 122, the conductive member 11 having the constricting section 12 is integrally formed via the dielectric thin film 123.

Next, the structure around the opening 122 of the semiconductor laser element 110 will be explained. A metal film 118 is formed as a light shielding layer on the side face 121 of the semiconductor laser element 110. Further, the opening 122 as the surface plasmon extracting section is formed at position corresponding to the active layer 115 of this metal film 118. This metal film 118 is formed in thickness of not less than the intrusion of the surface plasmon so as to prevent the leakage of the surface plasmon from other parts than the opening 122. Between this metal film 118 and the side face 121 of the optical element, an insulating layer 119 is formed for preventing the short between the electrodes 111 and 117 of the metal film 118.

As illustrated in FIGS. 11(a) and 11(b), the semiconductor laser element 110 is structured such that the stripe section 120 of the lower clad layer 114 is formed in a vicinity of the side face of the semiconductor laser element 110. With this structure, on the active layer 115, the light emitting region is formed so as to contact the side face of the semiconductor laser element 110. Then, using the TE mode laser beam among the laser beams generated from the light emitting region, the surface plasmon is generated. Namely, at the side face of the active layer 115, the surface plasmon is generated when the laser beam is reflected in all directions, and the opening 122 is formed at the side of the active layer 115 for extracting the resulting surface plasmon.

By the surface plasmon as extracted through the opening 122, the near field is generated from the conductive member 11 having the constricting section 12 via the dielectric thin film 123.

According to the foregoing structure, the active region of the active layer 115 is reduced, and the locking efficiency of the laser beam is improved, which in turn increases the intensity of the laser beam in the small spot, thereby increasing the intensity of the near field generated at the constricting section 12. By forming the semiconductor laser element directly on the electric field generating element, improved productivity can be achieved.

In the electric field generating element wherein the conductive member having the constricting section and the laser beam generating section are integrally formed, the external electric polarization is detected by detecting changes in threshold current value of laser oscillation of the active layer 115. By measuring changes in threshold current value, the external electric polarization can be detected. Moreover, the ratio of the reflective cross section area of the constricting section 12 from which the surface plasmon is generated with respect to the area of the locking layer 113 is raised, thereby improving the S/N ratio of the detection signal.

As described, according to the electric field generating element wherein the conductive member 11 having the constricting section 12 and the semiconductor laser element 110 are formed in one integral part, improved reliability and productivity of the electric field generating element can be realized.

Next, a modified example of the electric field generating element wherein the conductive member provided with the constricting section and the laser beam generating section are formed in one integral part will be explained in reference to FIG. 12.

FIG. 12(a) is a top view illustrating the schematic structure of the electric field generating element in accordance with an modified example wherein the conductive member having the constricting section and the laser beam generating section are formed in one integral part, and FIG. 12(b) is a cross sectional view schematically showing the structure of the modified example. As illustrated in FIG. 12(b), in the modified example of the electric field generating element wherein the conductive member having the constricting section and the laser beam generating section are integrally formed, the lens 128 for converging the laser beam is provided at the end face of the projected laser beam of the laser beam generating section 14, the substrate 10 is formed on the surface of the lens 128 on the surface of the lens 128 facing the interface between the lens 128 and the end face of the emitted laser beam, and the conductive member 11 having the constricting section 12 is formed on the surface of the substrate facing the interface between the substrate 10, and the lens 128. For the lens 128 for converging the laser beam 16, a diffraction lens, or a solid emulsion lens is preferably adopted.

The laser beam 16 emitted from the laser beam generating section 14 is subjected to changes in direction of the electric field vector by the lens 128, and the p-polarized laser beam 16 is converged onto the constricting section 12. As a result, the surface plasmon can be excited efficiently at the constricting section 12.

In the present embodiment, the external electric polarization is detected in the following manner. That is, as in case of the examples explained earlier, the existence of the external electric polarization can be detected by measuring changes in threshold current of the laser oscillation, thereby detecting the existence of the external electric polarization.

As described, the electromagnetic field generating element in accordance with the present embodiment is arranged such that the light source is a semiconductor laser element, and the semiconductor laser element and the conductive member are formed in one integral part. With this arrangement, near field can be generated by a laser beam from a semiconductor laser element as a light source, and the conductive member can be integrally formed with the semiconductor laser element, thereby improving reliability and productivity of the electromagnetic field generating element.

Third Embodiment

Figure 13:
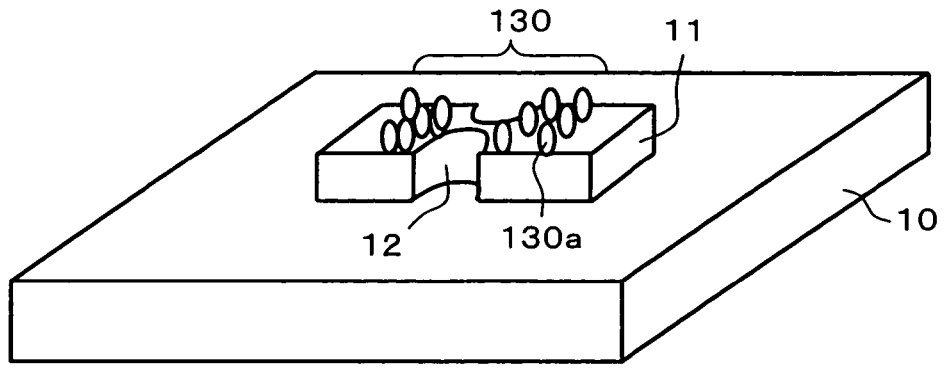
FIG. 13(a) is a perspective view illustrating the structure of the electric field generating element in accordance with the third embodiment of the present invention.
FIG. 13(b) is a top view illustrating the structure of the electric field generating element in accordance with the third embodiment of the present invention.
FIG. 13(c) is a top view illustrating the structure of the electric field generating element in accordance with the third embodiment of the present invention.
Figure 13:
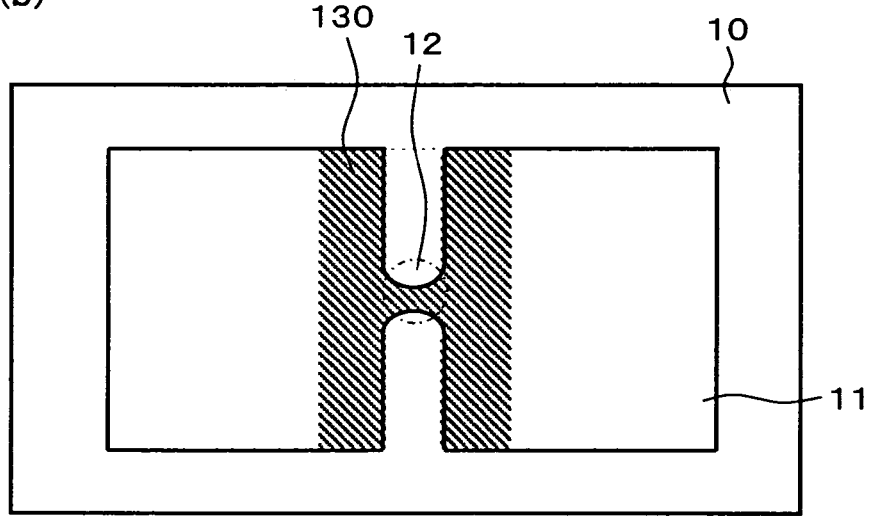
Figure 13:
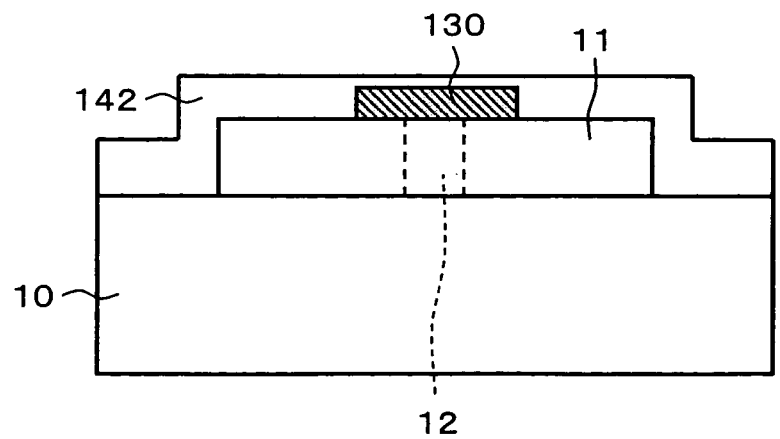
Figure 14:
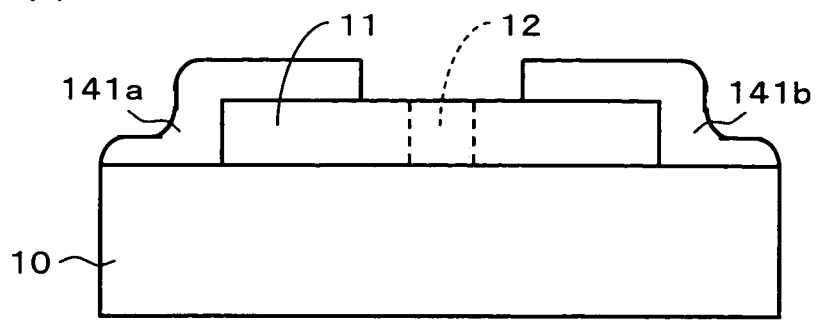
FIGS. 14(a) through 14(d) show manufacturing processes of an electric field generating element of FIGS. 13(a) through 13(c).
Figure 14:
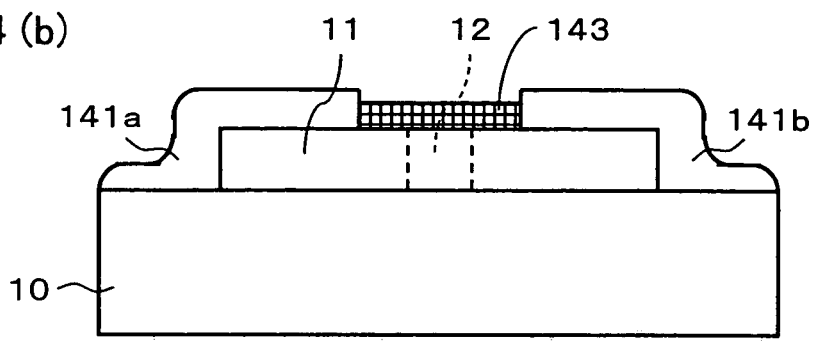
Figure 14:
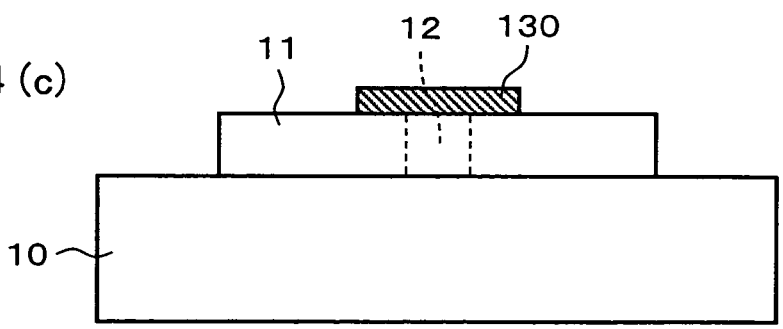
Figure 14:
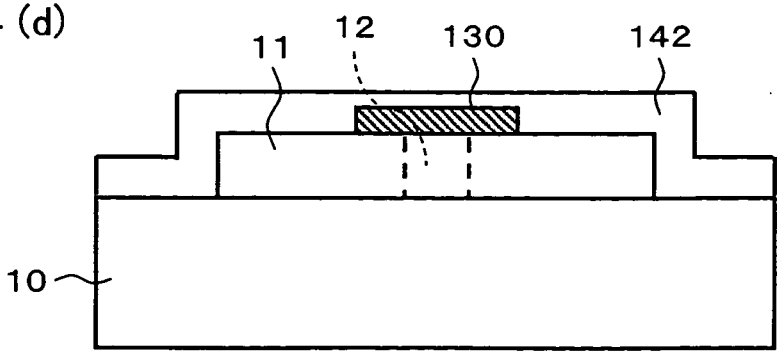
Figure 15:
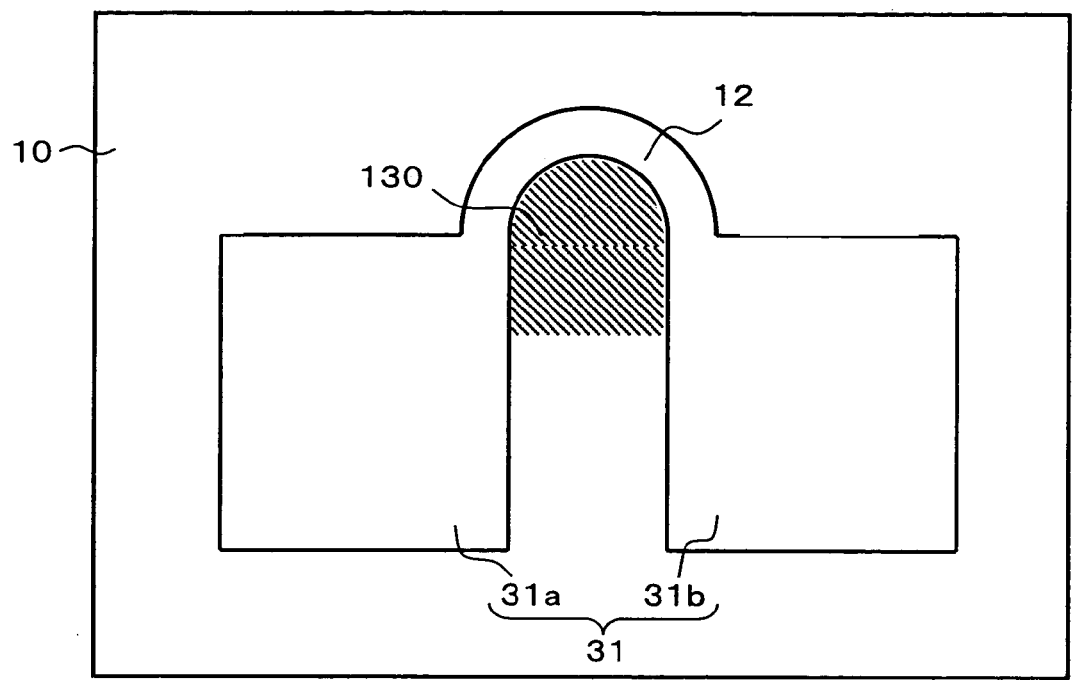
FIG. 15 is a top view illustrating another structure of the electric field generating element in accordance with the third embodiment of the present invention.

The following descriptions will explain still another embodiment of the present invention in reference to FIG. 13 to FIG. 15. For ease of explanation, members (structures) having the same functions as those shown in the drawings pertaining to the first and second embodiments above will be given the same reference symbols, and explanation thereof will be omitted here.

FIGS. 13(a) through 13(c) schematically show the structure of the electric field generating element in accordance with the third embodiment of the present invention. FIG. 13(a) is a perspective view schematically showing the electric field generating element in accordance with the third embodiment of the present invention. As illustrated in FIGS. 13(a) through 13(c), from the electromagnetic field generating element 17 shown in FIG. 1, the laser beam generating section 14 and the converging lens 13 are omitted, and in a vicinity of the constricting section 12 of the conductive member 11, a layer 130 of fine metal particles 130a is formed for generating the near field. FIG. 13(b) is a schematic plan view of FIG. 13(b), and shows the region where the layer of fine metal particles 130 is formed in a vicinity of the constricting section 12 of the conductive member 11. FIG. 13(c) is a cross sectional view of FIG. 13(a), and shows the structure wherein the conductive member 11 is formed on the substrate 10, and further the fine metal particle layer 130 is formed on the conductive member 11, and is covered with the insulating layer 142.

Here, for the fine metal particles 130a, it is preferable to adopt Au, Cu, Pt, Ag with which the surface plasmon is liable to be excited, or dielectric fine particles such as $SiO_2$, plastic coated with metal such as Au, Cu, Pt, Ag, etc. The metal particles 130a have a particle diameter of not larger than 100 nm.

For the material of the insulating layer 142 coating the fine metal particle layer 130, a material having an index of refraction satisfying the conditions of exciting the surface plasmon as explained in the first embodiment be preferably adopted, and non-limited examples for desirable materials in the red color wavelength region include $SiO_2$.

By forming the insulating layer 142 over the fine metal particles 130, between the conductive member 11 and the fine metal particle layer 130 can be insulated, and fine metal particle layer 130 can be fixed. Further, the leakage of current at the constricting section 12 can be prevented. Here, it is preferable that the fine metal particle layer 130 and the conductive member 11 be insulated.

When applying the laser beam from the laser beam generating section to the laser beam generating section 12, by the coupling between the surface plasmon excited at the constricting section 12 and the surface plasmon excited at the fine metal particle layer 130, the surface plasmon of still higher intensity can be realized, and the near field in a vicinity of the constricting section 12 can be intensified. Incidentally, in the fine metal particle layer 130, even when adopting the electric field vector of the incident light beam having S-wave, the surface plasmon is excited from the fine metal particle layer 130, and the surface plasmon has an electric field direction parallel to the electric field vector of the incident light beam.

As illustrated in FIGS. 14(a) to 14(d), the fine metal particle layer 130 is formed in the following manner. On the conductive member 11 formed on the substrate 10, resists 141a and 141b are applied in the region preventing the fine metal particles 130a (FIG. 14(a)), and an organic solvent 143 in which fine particles 130a are contaminated is applied onto the surface of the conductive member 11 (FIG. 14(b)), and is dried to evaporate only the organic solvent. After forming the fine metal particle layer in a vicinity of the constricting section 12, the resists 141a and 141b are lifted off (FIG. 14(c)), and the resulting insulating layer 142 is coated (FIG. 14(d)).

As the method of preventing fine metal particles from adhering to the region outside the region as desired of the conductive member 11, the following method may be adopted. That is, after the region as desired of the conductive member 11 is subjected to the surface chemical treatment, the organic solvent 143 including fine metal particles 130a is applied to the surface of the conductive member 11. As a result, fine metal particles 130a can be made so as to selectively adhere.

Next, another example of the third embodiment of the present invention will be explained in reference to FIG. 15. FIG. 15 is a top view schematically showing the structure wherein the layer of fine metal particles is formed on the conductive member having the constricting section of FIG. 3 as explained in the first embodiment.

As shown in another example of the third embodiment of FIG. 15, it may be arranged such that the layer of fine metal particles 130 is formed on the substrate 10 at region surrounded by the constricting section 12, the terminal 31a and the terminal 31b.

As another example of the third embodiment, when adopting the incident light beam having an electric field vector of S-wave, the electric field of the surface plasmon is parallel to the electric field vector of the incident light beam, and is vertical to the surface of the constricting section 12.

Therefore, according to the third embodiment including the fine metal particle layer 130, with a projection of a light beam having P-wave, the intensity of the excited surface plasmon can be increased, and the near field of still higher intensity can be increased. With the structure of the present embodiment, the plasmon can be excited from the reason of the fine metal particle layer 130 even when projecting the light beam having S-wave, and the near field can be obtained.

As described, the electric field generating element in accordance with the present embodiment is arranged such that fine metal particles are formed around the constricting section. With this structure, the surface plasmon is excited also from the fine metal particles by the light emitted from the light source, and with the resonance of this surface plasmon and the surface plasmon excited at the constricting section, the near field of higher intensity generated in a vicinity of the constricting section can be realized.

Fourth Embodiment

The following descriptions will explain the fourth embodiment of the present invention in reference to FIG. 16 to FIG. 19. For ease of explanation, members (structures) having the same functions as those shown in the drawings pertaining to the first through third embodiments above will be given the same reference symbols, and explanation thereof will be omitted here.

Figure 16:
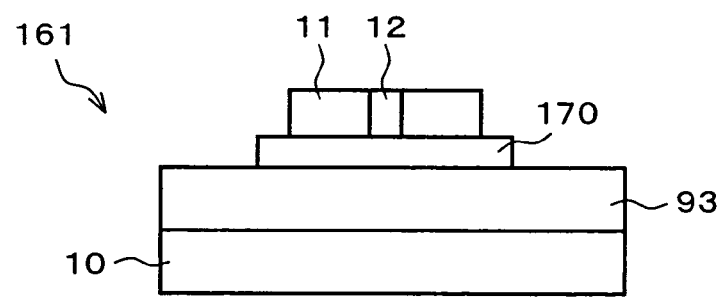
FIG. 16 is a cross sectional view illustrating the structure of the electric field generating element in accordance with the fourth embodiment of the present invention.

FIG. 16 is a cross-sectional view schematically showing the structure of the electric field generating element in accordance with the fourth embodiment of the present invention. In the electric field generating element 161 shown in FIG. 16, the laser beam generating section 14 and the converging lens 13 are omitted from the electromagnetic field generating element 17 shown in FIG. 1, and the light guide 93 is formed on the substrate 10, and a soft magnetic layer 170 is formed between the light guide 93 and the conductive member 11. For the soft magnetic layer 170, ferrite or garnet that is a soft magnetic oxide material (soft magnetic insulating material) is preferable, and the soft magnetic layer 170 is preferably formed in a thickness of around several μms.

According to the structure of the present embodiment, by forming the soft magnetic layer 170 between the conductive member 11 and the light guide 93, the magnetic flux as generated at the constricting section 12 of the conductive member 11 can be converged by the soft magnetic layer 170, and thus the magnetic flux density in a vicinity of the constricting section 12 can be increased, thereby obtaining a high intensity electric field. Moreover, as the soft magnetic layer 170 has a large electric resistance, the eddy current generated in the soft magnetic layer 170 by the high speed reversed electric field can be suppressed, and a loss in the electric field generated in a vicinity of the constricting section 12 can be reduced.

Figure 17:
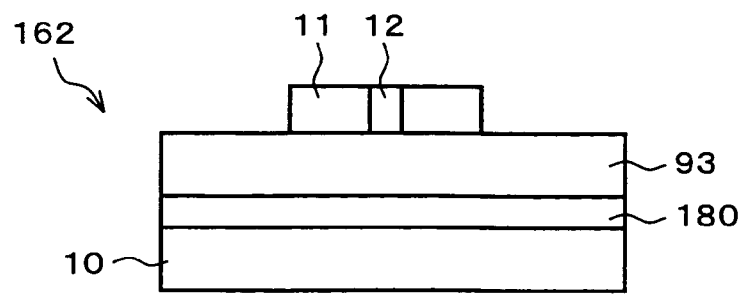
FIG. 17 is a cross sectional view illustrating the structure of the electric field generating element in accordance with the first modified example of the fourth embodiment of the present invention.

Next, the first modified example of the present embodiment will be explained in reference to FIG. 17. FIG. 17 is a cross sectional view of the electric field generating element in accordance with the first modified example if the present embodiment. In the electric field generating element 162 shown in FIG. 17, the laser beam generating section 14 and the converging lens 13 are omitted from the electromagnetic field generating element 17 shown in FIG. 1, and an electrically conductive metal layer 180 is formed on the substrate 10, and the light guide 93 is formed between the electrically conductive metal layer 180 and the conductive member 11. For the electrically conductive metal layer 180, Permalloy is preferable, and this electrically conductive metal layer 180 is preferably formed in thickness of around several μms. It is also preferable that an insulating layer be formed for preventing leakage of current from the conductive member 11 to the electrically conductive metal layer 180 when current is applied to the conductive member 11, and in the first modified example, the light guide 93 serves as the insulating layer. According to the foregoing structure of the first modified example, as the leakage of current to the electrically conductive metal layer 180 can be prevented by the light guide 93, a loss in magnetic field can be reduced, thereby obtaining a high intensity electric field by the electrically conductive metal layer 180.

The foregoing first modified example which permits the manufacturing process to be performed at room temperature offers a higher productivity, which in turns permits an electric field generating element to be manufactured at low cost as compared to the aforementioned embodiments in addition to the effect of increasing the intensity of the magnetic field in a vicinity of the constricting section 12 as achieved from the aforementioned embodiments.

Figure 18:
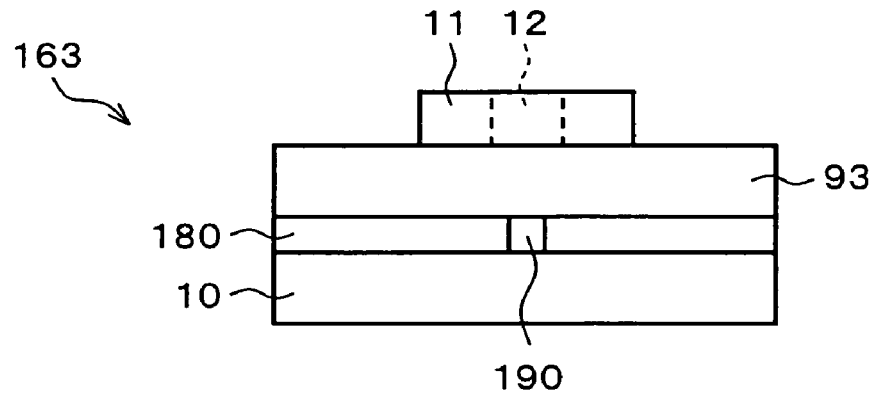
Figure 18:
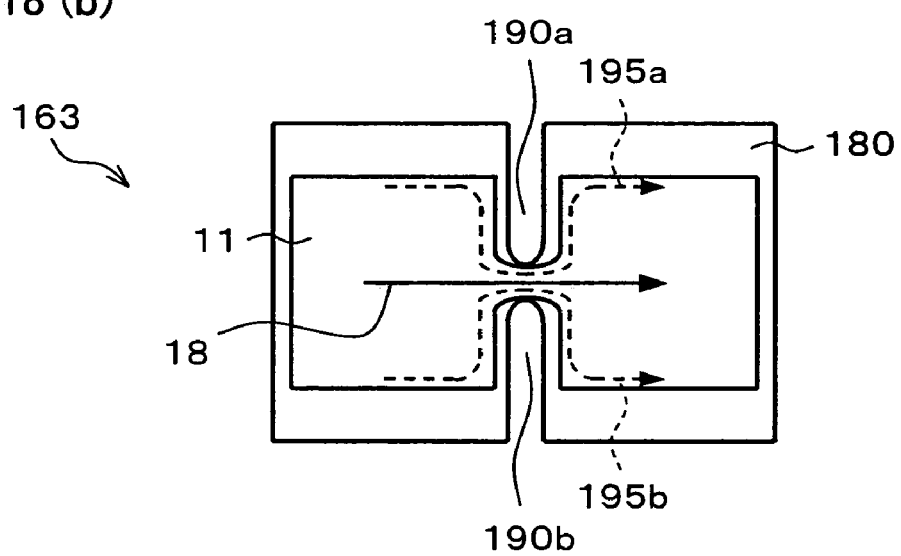
Figure 18:
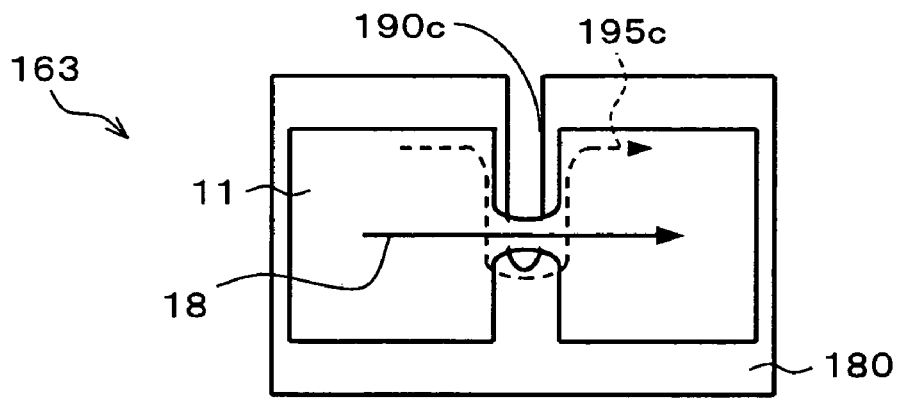

Another modified example of the present embodiment will be explained in reference to FIG. 18 to FIG. 20. FIG. 18(*a*) is a cross sectional view of an electric field generating element 163 in accordance with the second modified example of the present embodiment. FIGS. 18(*b*) and 18(*c*) are top views of the electric field generating element 163. In the cross sectional view of FIG. 18(*a*) showing the electric field generating element 163, the laser beam generating section 14 and the converging lens 13 are omitted from the electromagnetic field generating element 17 shown in FIG. 1, and the electric field generating element 163 has the same structure as the electric field generating element 162 shown in FIG. 17 except that the electrically conductive metal layer 180 includes a recessed section 190 that extends substantially along the recessed section that forms the constricting section 12 of the conductive member 11. In the electric field generating select 163 in accordance with the second modified example of the present embodiment, the recessed section 190 can be formed in two ways, and the recessed sections 190 formed in these two ways are shown in the top views of FIG. 18(*b*) and FIG. 18(*c*) respectively. In the structure of FIG. 18(*b*), as the recessed section 190 in the electrically conductive metal layer 180, formed are a recessed section 190*a* and a recessed section 190*b* in substantially U-shape along the shape of the recessed sections that form the constricting section 12 of the conductive member 11. In this structure, the most dinted portions of the recessed sections of the constricting section 12 and the most dinted portions of the recessed sections 190*a* and 190*b* are aligned in the direction vertical to the surface of the substrate 10. On the other hand, in the structure of FIG. 18(*c*), as the recessed section 190 in the electrically conductive metal layer 180, formed is a single recessed section 190*c* in substantially U-shape that extends from one of the recessed sections to the other recessed section that form the constricting section 12 of the conductive member 11 so as to cross the portion facing the constricting section 12. In this structure, the most dinted portion of the recessed section 190*c* is located on the side of the other recessed section at around the portion below the side face on the side of the other recessed section of the constricting section 12.

In the conductive member 11, when the magnetic field is switched by the high frequency AC electric field, the eddy current is generated from the electrically conductive metal layer 180 by switching the electric field by the high frequency AC electric field. In some cases, however, this eddy current needs to be prevented.

First, the path of the eddy current in the electrically conductive metal layer 180 having the recessed section shown in FIG. 18(*b*) will be explained. As illustrated in FIG. 18(*b*), when the current 18 is applied to the conductive member 11 from the left side to the right side of the sheet, the eddy current as generated in the electrically conductive metal layer 180 flows along the recessed sections 190*a* and 190*b* as indicated by the eddy currents 195*a* and 195*b*, and at the part right below the constricting section 12, the eddy current 195*a* and 195*b* flow in the same direction as the current 18. Therefore, in the region where the recessed sections 190*a* and 190*b* are most dinted, i.e., on the side face of the constricting section 12, the electric field by the current 18 and the electric field by the eddy currents 195*a* and 195*b* are generated so as to be mutually intensified, thereby increasing the intensity of the electric field.

Next, the path of the eddy current in the electrically conductive metal layer 180 having the recessed section as explained in reference to FIG. 18(*c*) will be explained. As illustrated in FIG. 18(*c*), when the current 18 is applied to the conductive member 11 from the left side to the right side of the sheet, the eddy current generated in the electrically conductive metal layer 180 flows along the recessed section 190*c* as indicated by the eddy current 195*c* in the figure, at the most dinted portion of the recessed section 190*c*, i.e., on one of the side faces of the constricting section 12, the current 18 and the eddy current 195*c* flow in mutually opposite directions, and the magnetic field intensity is therefore small. On the other hand, on the other side face of the constricting section, the current 18 and the eddy current 195 flow in the same direction, and the magnetic field intensity is increased. Therefore, it may be arranged so as to generate the magnetic field from either one of these two side faces of the constricting section 12.

Figure 19:
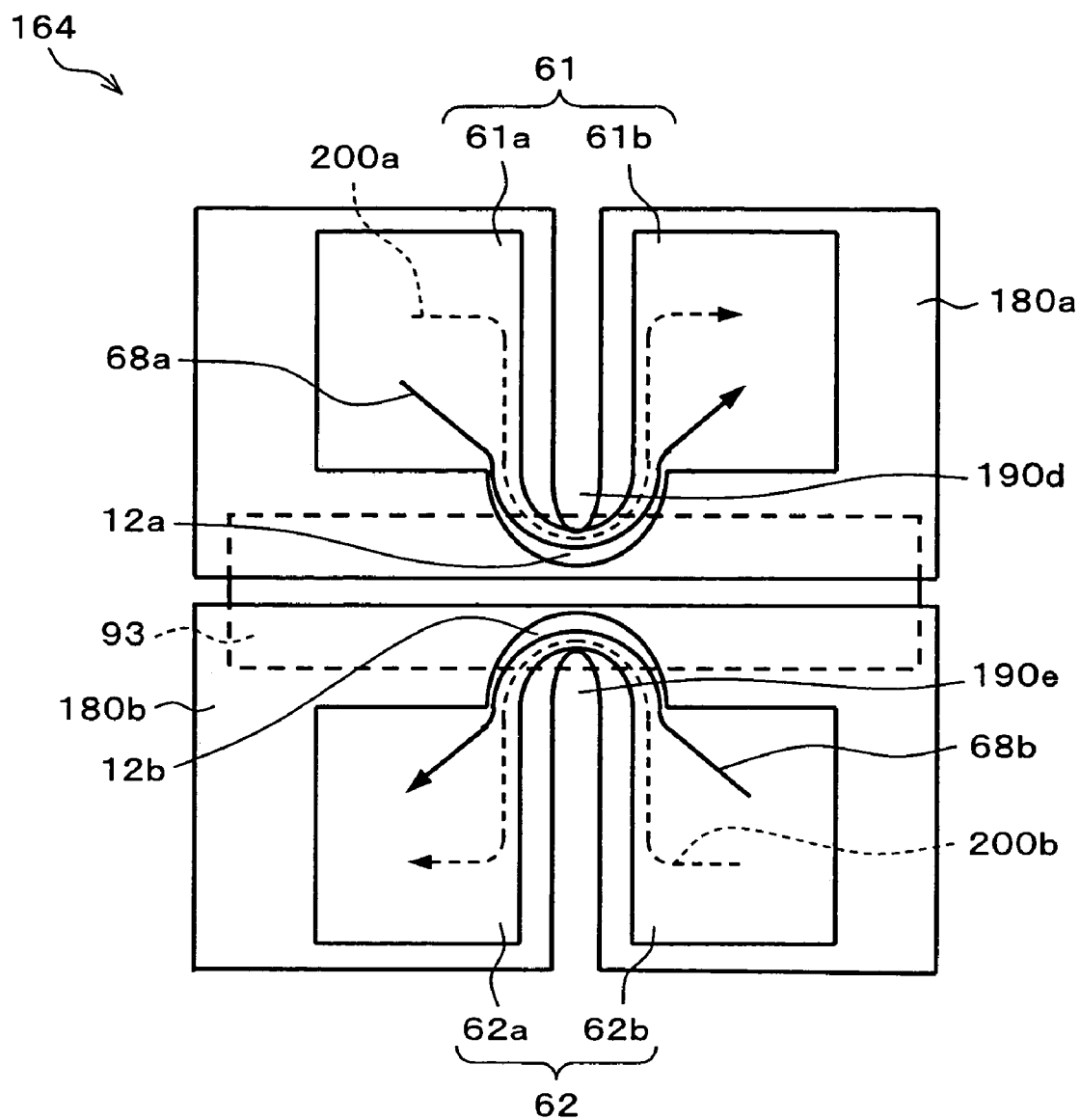
FIG. 19 is a top view illustrating the structure of the electric field generating element in accordance with the third modified example of the fourth embodiment of the present invention.

FIG. 19 is a top view of the third modified example, wherein a recessed section is formed in the electrically conductive metal layer. An electric field generating element 164 in accordance with the third modified example adopts the conductive member 61 and the conductive member 62 shown in FIG. 6 as explained in the first embodiment. In this electric field generating element 164, an electrically conductive metal layer 180*a* is formed right under the conductive member 61 via the light guide 93, and an electrically conductive metal layer 180*b* is formed via the light guide 93 right under the conductive member 62. The electrically conductive metal layer 180*a* includes a U-shaped recessed section substantially along the shape of the region formed under the U-shaped region surrounded by the terminal 61*a*, the constricting section 12*a*, and the terminal 61*b*. The electrically conductive metal layer 180*b* includes a U-shaped recessed section 190*e* substantially along a shape of the region formed under the U-shaped region surrounded by the terminal 62*a*, the constricting section 12*b*, and the terminal 62*b*. The most dinted portion of the recessed section 190*d* and the most dinted portion of the recessed section of the constricting section 12*b* of the conductive member 82 are aligned in the direction vertical to the surface of the substrate 10.

As explained in the first embodiment of the present invention, when the current flows in the conductive member 61 from the terminal 61*a* to the terminal 61*b*, and current 68*b* flows in the conductive member 62 from the terminal 62*b* to the terminal 62*a*, the eddy current 200*b* in the electrically conductive metal layer 180*a* right below the conductive member 61 is generated from the terminal 62*b* to the terminal 62*a*. Therefore, in both side faces of the constricting section 12*a* of the conductive member 61, the current 68*a* and the eddy current 200*a* flow in the same direction, and at both side faces of the constricting section 12*b* of the conductive member 62, the current 68 and the eddy current 200*b* flow in the same direction, thereby generating a high intensity electric field in a vicinity of the constricting section 12*a* and the constricting section 12*b*.

The light guide 93 is not particularly limited as long as the laser beam is incident onto the constricting sections 12*a* and 12*b*. For example, the light guide 93 may be formed parallel to the recessed section 190*d* of the electrically conductive metal layer 180*a* and the recessed section 190*e* of the electrically conductive metal layer 180*b*.

Figure 20:
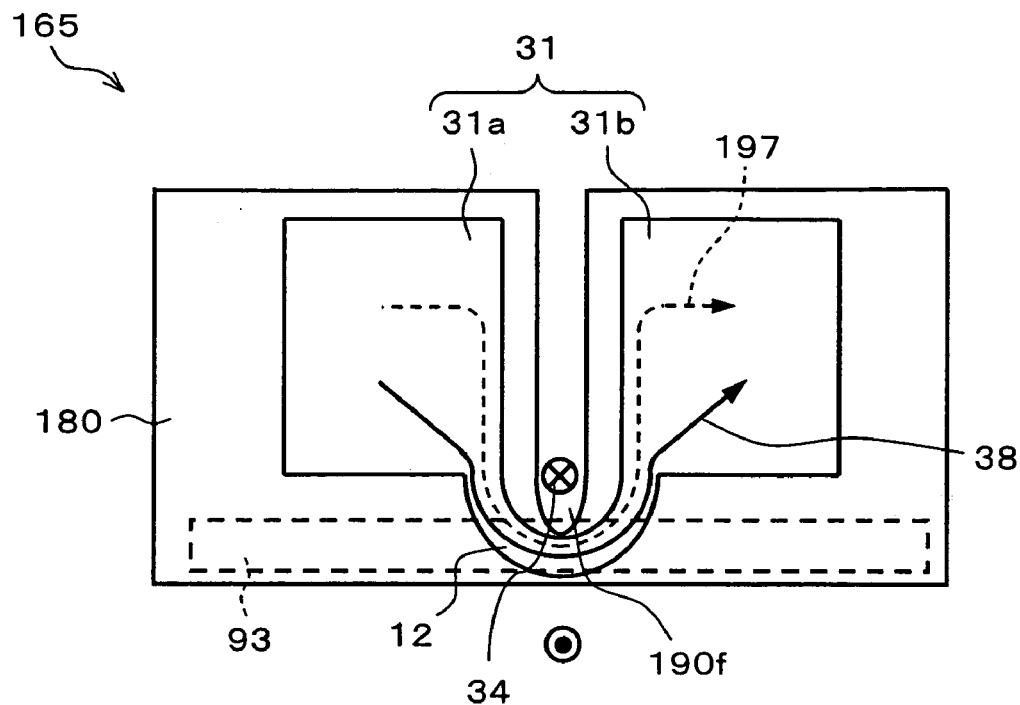
FIG. 20 is a top view illustrating the structure of an electric field generating element in accordance with the fourth modified example of the fourth embodiment of the present invention.

FIG. 20 is a top view showing the fourth modified example wherein a recessed section is formed on the electrically conductive metal layer 180. The electric field generating element 165 of the fourth modified example adopts the conductive member 31 (the structure as reversed from FIG. 3) having the structure shown in FIG. 3 adopted in the first embodiment, and the electrically conductive metal layer 180 is formed via the light guide 93. The electrically conductive metal layer 180 has a U-shaped recessed section 190f substantially along the U-shaped region surrounded by the terminal 31a, the constricting section 12 and the terminal 31b. The most dinted portion of the recessed section 190f and the most dinted portions of the recessed sections that form the constricting section 12 of the conductive member 31d are aligned in the direction vertical to the surface of the substrate 10.

As explained in the first embodiment of the present invention, when the current 38 flows in the conductive member 31 from the terminal 31a to the terminal 31b, the eddy current 197 in the electrically conductive metal layer 180 right below the conductive member 31 is generated in the direction from the terminal 31a to the terminal 31b. Therefore, in the constricting section 12 of the conductive member 31, the current 38 and the eddy current 197 flow in the same direction. As a result, as compared to the first modified example (FIG. 3) of the first embodiment, the vertical electric field of still higher intensity can be realized in a vicinity of the side face 34 of the constricting section 12. The structure of preventing the eddy current is not limited to the structure of the present embodiment as long as the path of the eddy current generated in the electrically conductive metal layer 180 is in the same direction as the direction of the current in the conductive member at portion right below the constricting section 12 of the conductive member.

As described, the electric field generating element of the preset embodiment includes a soft magnetic layer between the conductive member and the substrate.

With this structure, the magnetic flux generated at the constricting section by the current applied to the conductive member is converged by the soft magnetic layer. As a result, the intensity of the magnetic flux is increased in a vicinity of the constricting section, thereby obtaining the high intensity electric field.

The electric field generating element of the present embodiment may be arranged such that the soft magnetic layer is a soft magnetic insulating member. With this structure, the eddy current to be generated by changes in electric field of the soft magnetic layer can be suppressed, and the loss in magnetic field can be reduced. As a result, the high intensity electric field can be obtained in a vicinity of the constricting section.

The electric field generating element of the present embodiment may be arranged such that the electrically conductive metal layer and the insulating layer are formed between the conductive member and the substrate from the side of the substrate.

According to the foregoing structure, when the current flows in the conductive member, the leakage of current into the electrically conductive metal layer can be prevented by the insulating layer, and thus the magnetic field loss can be reduced. As a result, a higher intensity electric field can be obtained by the electrically conductive metal layer.

The electric field generating element of the present embodiment is arranged such that the constricting section is formed by the opposed recessed sections which are dinted so as to be extended on the laminated surface from respective side ends with respect to the direction of current in the conductive member, and that the electrically conductive metal layer has recessed sections substantially along the recessed sections of the conductive member, wherein the most dinted portions of the recessed sections of the conductive member and the most dinted portion of the recessed section of the electrically conductive metal layer, that is formed substantially along the shape of the recessed sections of the conductive member are aligned in the direction vertical to the surface of the substrate.

According to the foregoing structure, the recessed sections of the electrically conductive metal layer are formed substantially along the recessed sections of the conductive member, and the most dinted portions of the respective recessed sections are aligned in the direction vertical to the surface of the substrate. With this structure, the eddy current generated by changes in magnetic field at the electrically conductive metal layer and current in the constricting section flow in the same direction. As a result, the electric field by the eddy current and the electric field by the current in the constricting section are mutually intensified, thereby increasing the intensity of the electric field in a vicinity of the constricting section.

The electric field generating element of the present embodiment is arranged such that the constricting section is formed by the opposed recessed sections which are dinted so as to be extended on the laminated surface from respective side ends with respect to the direction of current in the conductive member, and that the electrically conductive metal layer has a single recessed section that extends along each recessed section of the conductive member from one of the recessed sections to the other recessed section of the conductive member, and the most dinted portion of the recessed section of the electrically conductive metal layer is located on the side of the other recessed section of the conductive member.

According to the structure, the recessed section of the electrically conductive metal layer is formed so as to extend from one of the recessed sections to the other recessed section of the conductive member, and the most dinted portion is located on the side of the other recessed section of the conductive member. With this structure, the direction of the eddy current according to changes in magnetic field at the electrically conductive metal layer can be set in the same direction of the current on one of the side faces of the constricting section. It is therefore possible to generate the electric field from a selected part as desired of the constricting section.

Fifth Embodiment

Figure 21:
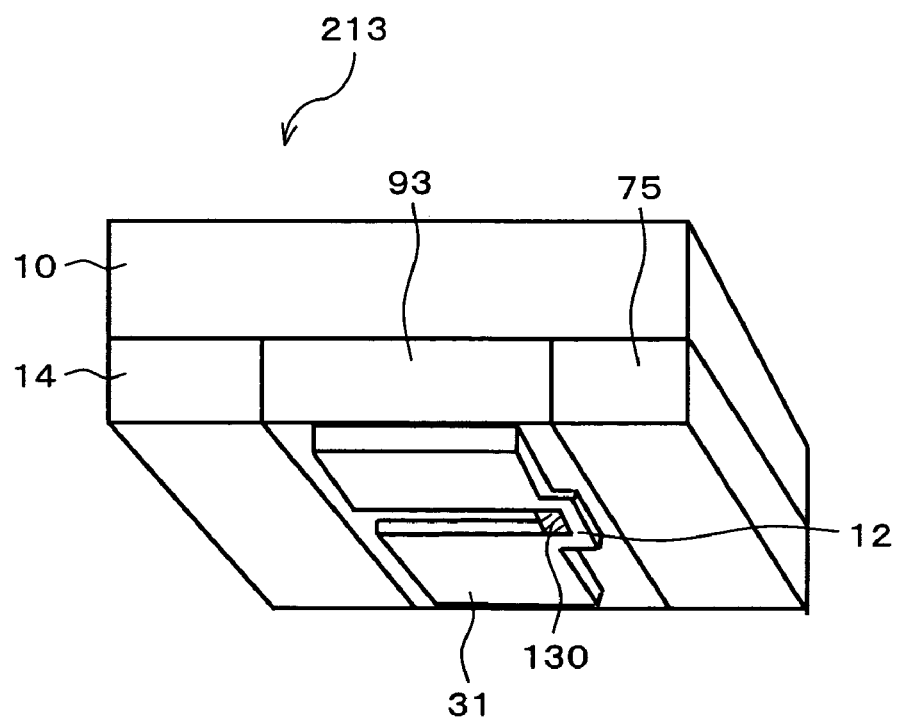
FIG. 21 is a top view illustrating the structure of an information recording and reproducing head in accordance with the fifth embodiment of the present invention.
Figure 22:
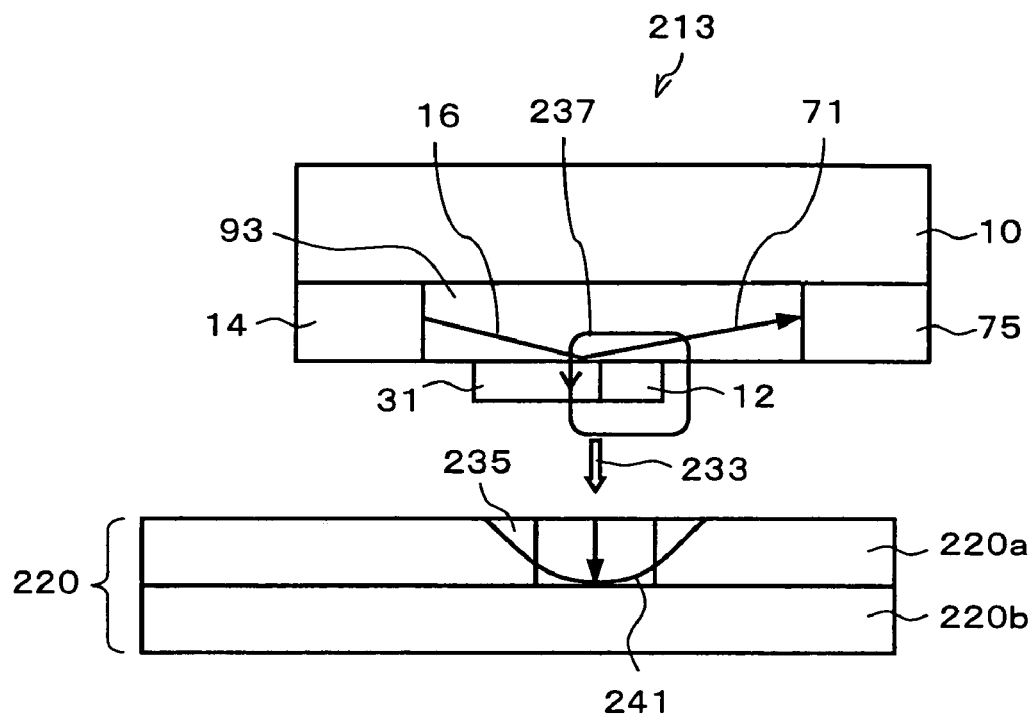
FIG. 22(a) is a cross sectional view which explains a high intensity recording operation onto a recording track at high density by an information recording and reproducing head of FIG. 21.
FIG. 22(b) is a cross sectional view which explains a high intensity recording operation onto a recording track at high density by an information recording and reproducing head of FIG. 21.
Figure 22:
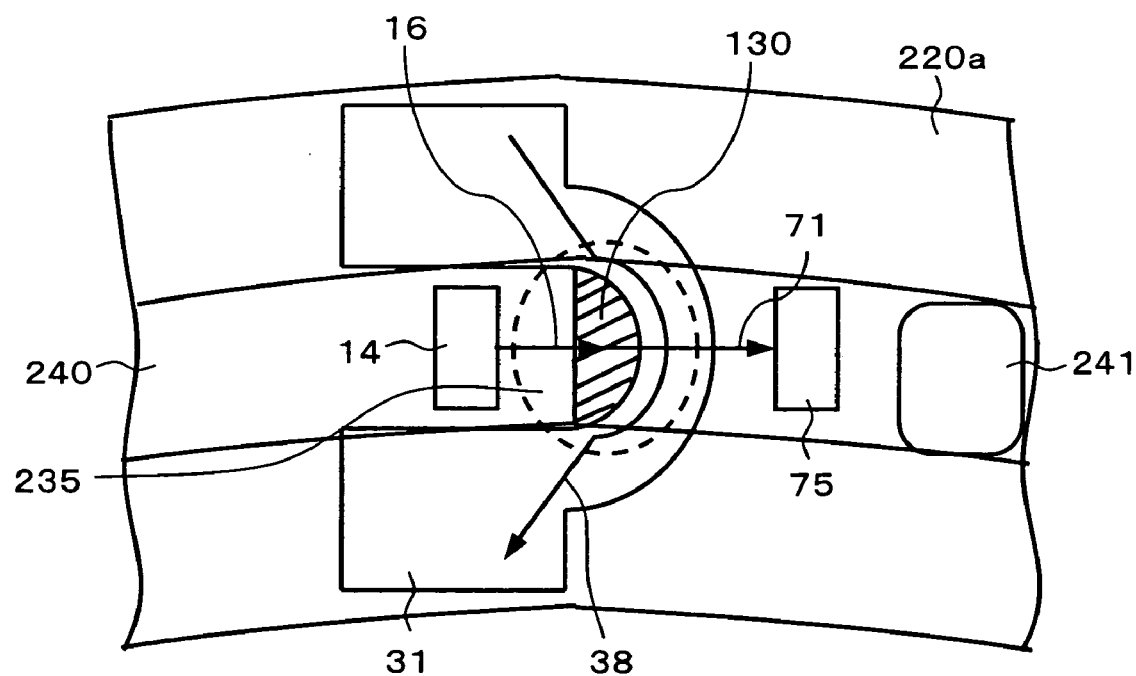

The following descriptions will explain the fourth embodiment of the present invention in reference to FIGS. 21 and 22. For ease of explanation, members (structures) having the same functions as those shown in the drawings pertaining to the first through fourth embodiments above will be given the same reference symbols, and explanation thereof will be omitted here.

FIG. 21 is a perspective view schematically showing an information recording and reproducing head provided with the electric field generating element adopted in the first through forth embodiments and the electric field detector. As illustrated in FIG. 21, according to the information recording and reproducing head 213 of the present invention, the light guide 93 is formed on the substrate 10, and via this light guide 93, the laser beam generating section 14 and the laser detector 75 are provided on the substrate 10, and further the conductive member 31 having the constricting section 12 is formed on the surface of the light guide 93 facing the interface between the light guide 93 and the substrate 10.

The layer 130 of the fine metal particles is formed in such in the region surrounded by the respective terminals of the conductive member 31 and the constricting section 12. Namely, the information recording and reproducing head 213 is arranged such that the layer of fine metal particles 130 shown in FIG. 15 is formed on the conductive member 31 of FIG. 3, and the light guide 93, laser beam generating section 14, and the laser detector 75 are formed on the substrate 10 with the positional relationship of FIG. 9.

Next, recording and reproducing operations of the information recording and reproducing head 213 of the present embodiment with respect to the information recording medium will be explained with reference to FIG. 22. FIG. 22(a) is cross sectional front view of the information recording and reproducing head 213 and an information recording medium 220 (medium) of the present embodiment. FIG. 22(b) is a plan view when the information recording and reproducing head 213 and the information recording medium 220 are seen from the side of the information recording and reproducing head 213. The information recording medium 220 shown in FIG. 22 is made up of a substrate 220b and a recording face 220a, rare-earth transition metal magnetic recording medium or the FePt series magnetic recording medium.

First, recording operations will be explained. From the laser beam generating section 14 of the information recording and reproducing head 213, at the recording level higher than the reproducing level, the emitted laser beam 16 is incident on to the fine metal particle layer 130 of the conductive member, the near field 233 is incident on the recording face 220a of the information recording medium 220, and the irradiated area of the 233 of the recording face 220 of the information recording medium is heated, resulting in an area heated to recording temperature not less than the recording temperature in the heated area 235. In the conductive member 31, the current 38 flows as illustrated in FIG. 22(b) from the top surface of the sheet to the bottom surface of the sheet, and in the constricting section 12 formed on the conductive member 31, the magnetic field 237 is generated. As a result, in an overlapped area between the heated area at or above the recording temperature in the heated area 235, and the electric field 237, the optically assisted magnetic recording by the near field can be realized.

Next, reproducing operations will be explained. When the laser beam 16 is projected from the laser beam generating section 14 to the fine metal particle layer 130 formed on the conductive member 31 at a reproducing level, the electric polarization according to the recording mark 241 and the polarization of the near field 233 excited by the fine metal particle layer 130 are mutually interacted, which result in changes in polarization direction and intensity of the reflected laser beam 71 by the mutual interaction. As a result, the magnetic information of the recording mark 241 can be obtained by detecting the reflected laser beam 71 by the laser beam detecting section 75.

Even when the laser beam 16 is not applied to the fine metal particle layer 130 at the reproducing level, with respect to the electric field generating the recording mark 241, the dielectric current is generated in the conductive member 31 by passing the constricting section 12 formed in the conductive member 31. By detecting changes in this dielectric current, the magnetic information can be reproduced from the recording mark 241.

As described, the optically assisted magnetic recording and reproducing device of the present embodiment for recording and reproducing using the near field by heating the small spot of the information recording medium 220 is arranged such that by the near field 233, the information recording medium 220 can be heated efficiently, and the magnetic recording can be performed by the high intensity electric field generated in a vicinity of the constricting section, and the information recorded on the information recording medium 220 can be reproduced by detecting by the laser beam detecting section 75, the information on the electric polarization according to the recording mark 241 recorded on the information recording medium 220 as heated by the near field 233 based on the reflected laser beam 71 of the laser beam 16.

According to the forgoing structure, since it is not necessary to generate the magnetic field at position as desired by an extended yoke section as in the case of prior art, attenuation or delay of the electric field can be suppressed, thereby providing an information recording and reproducing head suited for high frequency magnetic recording and reproducing. It is also possible to provide the information recording and reproducing head for optically assisted magnetic recording and reproducing by using the near field at the smaller spot than the diffraction limit of light. Furthermore, as a high intensity near field can be obtained, it is possible to realize a recording and reproducing head for recording and reproducing information on and from the recording medium having high coercive force.

Sixth Embodiment

Figure 23:
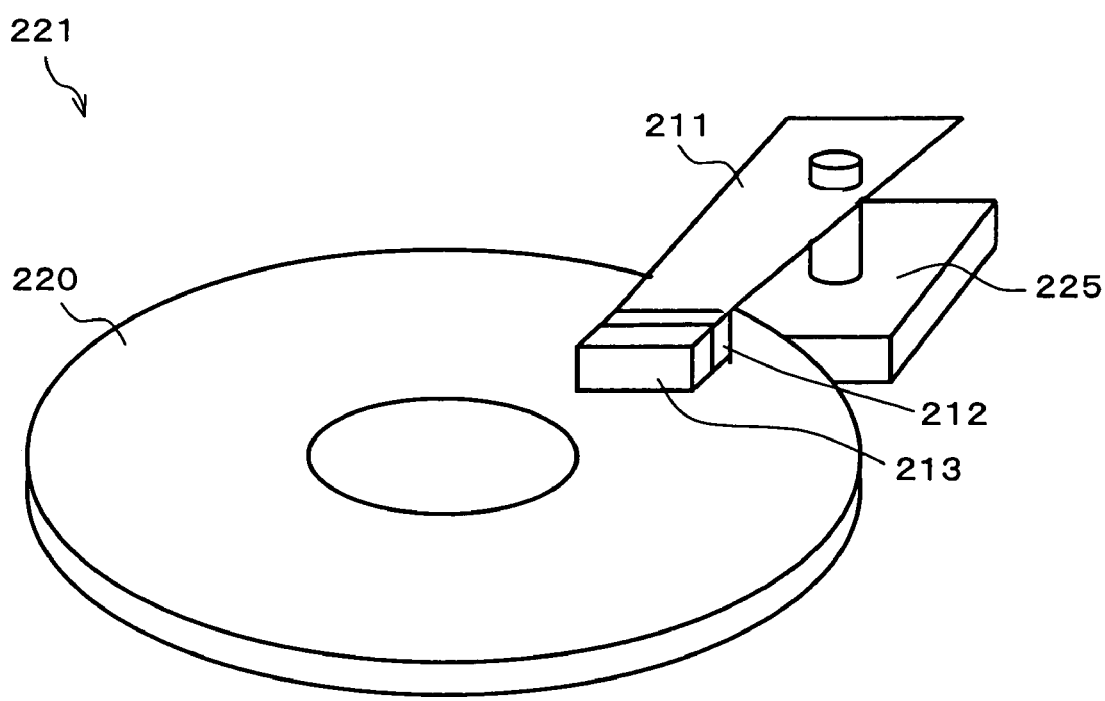
FIG. 23 is a perspective view illustrating the structure of essential parts of an information recording and reproducing device in accordance with the sixth embodiment of the present invention.
Figure 24:
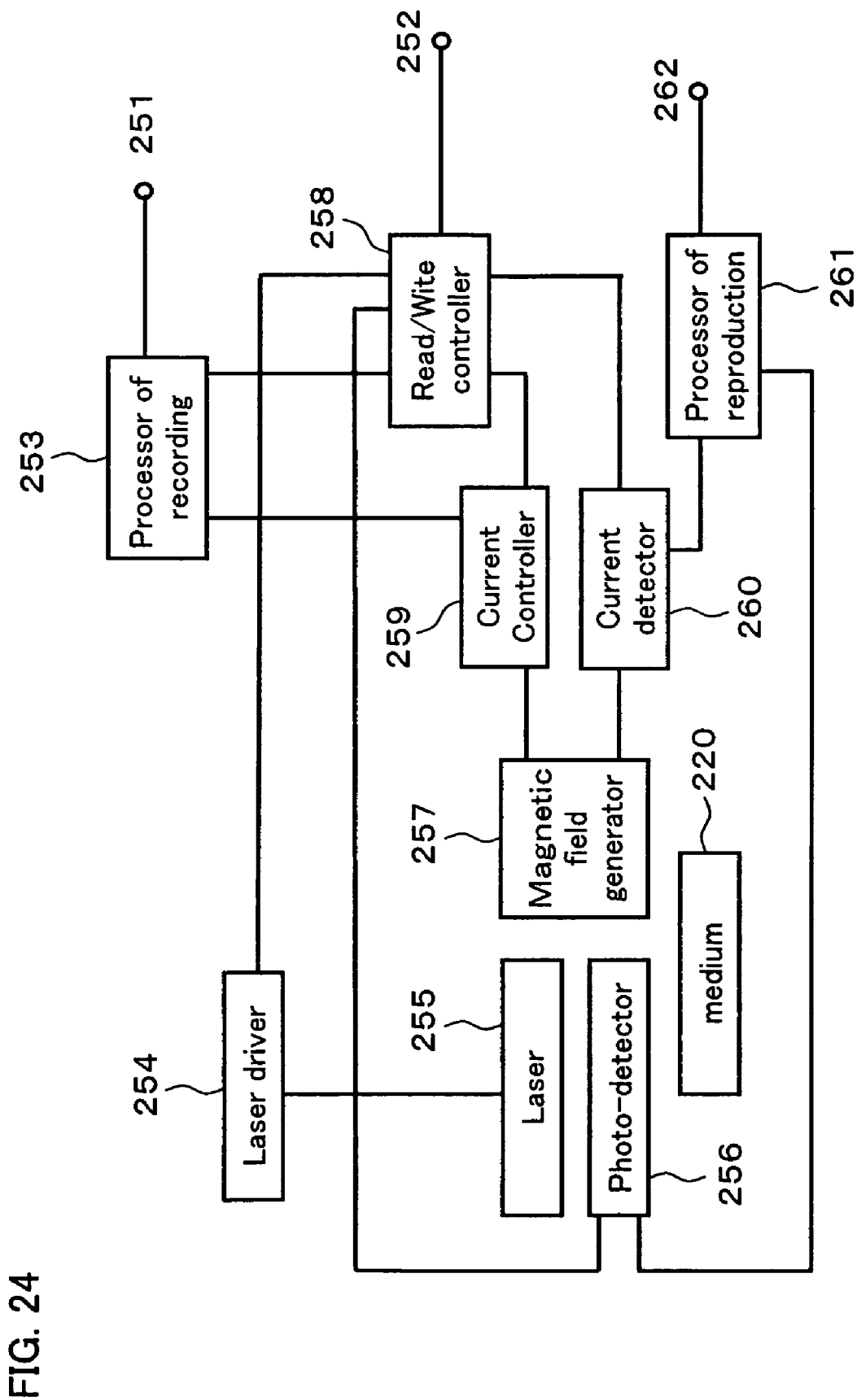
FIG. 24 is a block diagram illustrating the structure of a recording and reproducing system of the information recording and reproducing device of FIG. 23.
Figure 25:
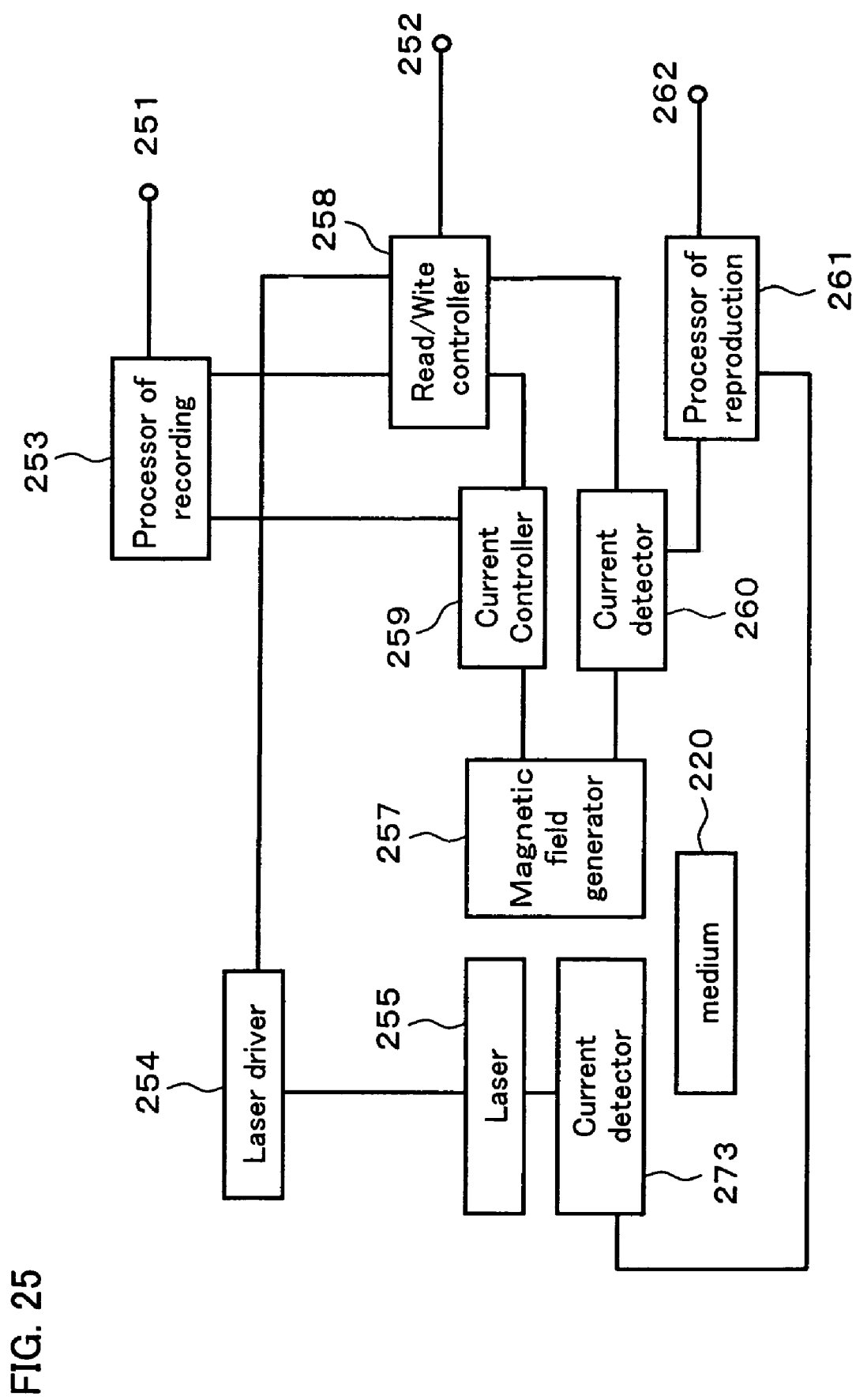
FIG. 25 is a block diagram illustrating the structure of a recording and reproducing system in accordance with another structure of the information recording and reproducing device in accordance with the sixth embodiment of the present invention.

The following descriptions will explain the sixth embodiment of the present invention in reference to FIGS. 23 through 25. For ease of explanation, members (structures) having the same functions as those shown in the drawings pertaining to the first through fourth embodiments above will be given the same reference symbols, and explanation thereof will be omitted here.

FIG. 23 is a perspective view showing essential parts of the information recording and reproducing device of the present invention. As illustrated in FIG. 23, information recording and reproducing device 221 of the present embodiment is arranged such that the information recording and reproducing head 213 is mounted to the slider 212 so as to slide on recording surface 220a (FIG. 22(a)) of the rotating information recording medium 220. Furthermore, the distance (flying height) between the information recording and reproducing head 213 and the recording face 220a of the information recording medium 220 is set to be not more than 100 nm. The slider 212 is supported by the arm 211. This slider 211 scans a recording track of the information recording medium 220 by an actuator 225 (moving means).

FIG. 24 is a block diagram schematically showing the structure of the recording and reproducing system of the information recording and reproducing device 221 of the present embodiment. The information recording and reproducing device 221 includes a recording and reproducing control terminal 252 for controlling the recording or reproducing from a device on an upstream side and an input terminal 251 for receiving a recording data from the device on the upstream side, and an output terminal 262 for outputting the reproducing data from the device on the upstream side, wherein the recording and reproducing control terminal 252 is connected to a recording and reproducing control section 258 (read/write controller) for controlling the recording or reproducing, and the input terminal 251 is connected to a data recording section 253 (processor of recording) for converting the recording data into a recording signal, and the output terminal 262 is connected to a data reproducing section 261 (processor of reproduction) for coding the reproducing signal. The recording and reproducing control section 258 is connected to a data recording section 253, a data reproducing section 261, a laser driving section 254 for controlling laser driving current from a laser emitting section 255 (laser) and a current control section 259 for controlling current in the magnetic field generating section 257 for generating a recording magnetic field from a recording signal from the data recording section 253.

A laser beam detecting section 256 (photo-detector) receives reflected from the laser beam generating section 255 in response to an instruction from the recording and reproducing control section 258, and detects changes in polarization direction and changes in intensity of the polarization light by mutual interaction between the information recording medium 220 and the near field, thereby outputting the results of detection to the data reproducing section 261. In response to the recording signal from the data recording section 253 and an instruction from the recording and reproducing control section 258, a current control section 259 (current controller) generates current according to the recording data with respect to the electric field generating section 257 (magnetic field generator). In response to the instructions from the recording and reproducing control section 258, a current detecting section 260 (current detector) reads a magnetic signal in the heated area of the information recording medium 220 based on the near field generated from the laser beam generating section 255, and a reproducing signal is output to the data reproducing section 261.

Next, recording and reproducing operations will be explained. When recording, in response to an instruction from the recording and reproducing control section 258, the laser driving section 254 drives the laser beam generating section 255 with a laser driving current than that when reproducing, and the laser beam generating section 255 projects the laser beam having a higher intensity than that when reproducing onto the electric field generating section 257. With an instruction from the recording and reproducing control section 258, the data recording section 253 converts recording data from the input terminal 251 into a recording signal, and is output to the current control section 259. Then, in response to the current according to the recording signal outputted from the current control section 259, the electric field generating section 257 generates recording electric field.

With a projection of the laser beam, by the near field generated by the surface 257, the information recording medium 220 is heated to a temperature to be high enough for recording, thereby recording the recording mark in the information recording medium 220.

When reproducing, with an instruction from the recording and reproducing control section 258, with a smaller driving current than that when recording, a laser driving section 254 (laser driver) drives the laser beam generating section 255. From this laser beam generating section 255, laser beam having a lower intensity than that when recording is projected onto the electric field generating section 257.

By the near field generated by the surface plasmon excited at the electric field generating section 257 with an application of the laser beam, the information recording medium 220 is heated to the temperature high enough for reproducing, and in response to an instruction from the recording and reproducing control section 258, the laser beam detecting section 256 detects the information of the recording mark on the information recording medium 220 by receiving the reflected laser beam, and outputs the reproducing signal to the data reproducing section 261. In response to an instruction from the recording and reproducing control section 258, the magnetic signal of the information recording medium 220 is converted by the electric field generating section 257, and the current as converted by the electric field generating section 257 is detected by the current detecting section 260 and the detection signal is output to the data reproducing section 261. In response to an instruction from the recording and reproducing control section 258, the data reproducing section 261 converts and outputs the reproducing data to the output terminal 262 by the detecting signal of the current detecting section 260 and the reproducing signal of the laser beam detecting section 256.

As described, according to the information recording and reproducing device 221 of the present invention, information recording and reproducing head 213 can be moved to a position as desired of the information recording medium 220, and at the desired position of the information recording medium 220, optically assisted magnetic recording and reproducing operations can be performed for recording or reproducing information on or from the small spot of the information recording medium 220. Further, using the near field generated from the constricting section 12, it is possible to heat up the information recording medium 220 efficiently, thereby recording information magnetically onto the information recording medium 220 by the high intensity electric field as generated from the vicinity of the constricting section 12. Furthermore, the information on electric polarization according to the recording mark recorded in the small spot of the information recording medium 220, as heated by the near field can be obtained by detecting the reflected light beam from the laser beam generating section 255 by the laser beam detecting section 256, it is possible to reproduce the information recorded on the information recording medium 220.

According to the forgoing structure, since it is not necessary to generate the magnetic field at position as desired by an extended yoke section as in the case of prior art, attenuation or delay of the electric field can be suppressed, thereby providing an information recording and reproducing device suited for high frequency magnetic recording and reproducing. According to the present embodiment, it is also possible to provide the information recording and reproducing device for optically assisted magnetic recording and reproducing by using the near field at the smaller spot than the diffraction limit of light. Furthermore, as the high intensity near field can be obtained, it is possible to realize a recording and reproducing head for recording and reproducing information on and from the recording medium having high coercive force.

Next, another structure of the information recording and reproducing device in accordance with the present embodiment will be explained in reference to FIG. 25. In the information recording and reproducing device of the present embodiment, the electric field generating element wherein the conductive member having the constricting section is integrally formed with the semiconductor laser element is adopted as the information recording and reproducing head.

FIG. 25 is a block diagram schematically showing the structure of the information recording and reproducing device of the recording and reproducing system. For ease of explanation, members (structures) having the same functions as those shown in the drawings pertaining to the embodiments above will be given the same reference symbols, and explanation thereof will be omitted here.

In the following, the differences between the information recording and reproducing device of the present embodiment and the information recording and reproducing device of the former examples will be explained. In the information recording and reproducing device of the present embodiment, the laser threshold current value detecting section 273 (current detector) is connected to the laser beam generating section 255. The threshold current value detecting section 273 detects changes in threshold current value of laser oscillation in the laser beam generating section 255. This detecting section 273 detects the electric polarization of the information recording medium 220 and outputs a reproducing signal to the data reproducing section 261. The laser threshold current value detecting section 273 is controlled by the instructions from the recording and reproducing control section 258.

According to the structure of the present embodiment, the structure of the recording and reproducing head can be simplified, and it is therefore possible to provide the information recording and reproducing device of high reliability at low cost.

The electric field generating element having the foregoing structure is further characterized in that the thickness of the constricting section is selected to be not more than the wavelength of the light beam from the light source.

According to the foregoing structure, when adopting the laser beam as a light beam from the light source, by projecting the laser beam on the constricting section from the side of the substrate, the surface plasmon is excited at the surface having irradiated thereon with the laser beam and the surface of the constricting section facing the laser beam incident surface as the thickness of the constricting section is selected to be not more than the wavelength. With the resonance of this surface plasmon excited at the laser beam irradiated surface of the constricting section and the surface plasmon excited at surface facing the laser beam irradiates surface of the laser beam of the constricting section, the near field of higher intensity generated in a vicinity of the constricting section can be realized.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is (us):

1. An electromagnetic field generating element, comprising:
   a light source; and
   a substrate having formed thereon a conductive member, wherein said conductive member includes a constricting section for narrowing down a current path; and
   a near field is generated at said constricting section by applying a light beam from said light source to said constricting section.

2. The electromagnetic field generating element as set forth in claim 1, wherein:
   said constricting section is formed in thickness of not more than a wavelength of the light beam emitted from said light source to said constricting section.

3. The electromagnetic field generating element as set forth in claim 1, wherein:
   a surface of said constricting section on an opposite side to an interface with said substrate is covered with a coating layer at least at a portion where said constricting section is formed, said coating layer having an index of refraction substantially a same as that of said substrate.

4. The electromagnetic field generating element as set forth in claim 1, wherein:
   said conductive member has three terminals connected at one location, which extend in a radial pattern from a connected part.

5. The electromagnetic field generating element as set forth in claim 4, wherein:
   respective angles formed by a current path of a terminal at a center among said three terminals and current paths of terminals on both sides are acute.

6. The electromagnetic field generating element as set forth in claim 1, wherein:
   said conductive member has four terminals connected at one location, which extend in a radial pattern from a connected part.

7. The electromagnetic field generating element as set forth in claim 1, wherein:
   fine particles of metal are applied onto a surface around a portion where said constricting section is formed.

8. The electromagnetic field generating element as set forth in claim 7, wherein:
   said metal of said fine particles is Au, Cu, Pt or Ag, or said fine particles are dielectric fine particles coated with Au, Cu, Pt or Ag.

9. The electromagnetic field generating element as set forth in claim 1, wherein:
   a soft magnetic layer is formed between said conductive member and said substrate.

10. The electromagnetic field generating element as set forth in claim 9, wherein:
    said soft magnetic layer is a soft magnetic insulating member.

11. The electromagnetic field generating element as set forth in claim 1, wherein:
    an insulating layer and an electrically conductive metal layer are formed between said conductive member and said substrate in this order from the side of said substrate.

12. The electromagnetic field generating element as set forth in claim 11, wherein:
    said constricting section is formed by opposed two recessed sections which respectively extend from both sides in a direction orthogonal to a current direction of said conductive member along a laminated surface.

13. The electromagnetic field generating element as set forth in claim 12, wherein:
    the electrically conductive metal layer has recessed sections substantially in shape along the recessed sections of said conductive member, and
    a most dinted portion of the recessed sections of said conductive member and a most dinted portion of the recessed section of said electrically conductive metal layer formed substantially in shape of the recessed sections of said conductive member are aligned in a direction vertical to the surface of said substrate.

14. The electromagnetic field generating element as set forth in claim 12, wherein:
    said recessed sections are formed substantially semi-circular in shape.

15. The electromagnetic field generating element as set forth in claim 14, wherein:
    said constricting section has a line width m that is a distance between rims at a narrowest portion of said conductive member, and a length twice as long as a diameter 2a of each of said recessed sections that is substantially semi-circular in shape.

16. The electromagnetic field generating element as set forth in claim 12, wherein:

said electrically conductive metal layer has a single recessed section that extends along respective recessed sections of the conductive member from one of the recessed sections to the other recessed section, and a most dinted portion of the recessed section of said electrically conductive metal layer is located on the side of the other recessed section of said conductive member.

17. The electromagnetic field generating element as set forth in claim 1, wherein:

said light source is a semiconductor laser element, and said semiconductor laser element and said conductive member are formed in one integral part.

18. An information recording and reproducing head, comprising:

an electromagnetic field generating element which includes a light source, and a substrate having formed thereon a conductive member, wherein said conductive member includes a constricting section for narrowing down a current path; and a near field is generated at said constricting section by applying a light beam from said light source to said constricting section a near field is generated at said constricting section by applying a light beam from said light source to said constricting section; and an electromagnetic field detector for detecting a light beam, wherein information is recorded on an information recording medium at a predetermined position with an application of a magnetic field generated at said constricting section as heated by said near field from said constricting section and information recorded on the information recording medium as heated by said near field is reproduced by detecting by said electric field detector, a reflected light of the light beam applied to said constricting section from said light source.

19. An information recording and reproducing head, comprising:

an information recording and reproducing head which comprises: an electromagnetic field generating element including a light source, and a substrate having formed thereon a conductive member, wherein said conductive member includes a constricting section for narrowing down a current path; and a near field is generated at said constricting section by applying a light beam from said light source to said constricting section, and an electromagnetic field detector for detecting a light beam, wherein information is recorded on an information recording medium at a predetermined position with an application of a magnetic field generated at said constricting section as heated by said near field from said constricting section and information recorded on the information recording medium as heated by said near field is reproduced by detecting by said electric field detector, a reflected light of the light beam applied to said constricting section from said light source; and moving means for moving said information recording and reproducing head to a predetermined position on said information recording medium.

* * * * *